United States Patent [19]

Huebner et al.

[11] 3,723,658

[45] Mar. 27, 1973

[54] EXTENDABLE MULTIPLEXER

[75] Inventors: Werner P. E. Huebner, Toronto, Ontario; Robert C. Long, Scarborough, Ontario, both of Canada

[73] Assignee: D. D. I. Communications, Inc., Lewiston, N.Y.

[22] Filed: June 30, 1971

[21] Appl. No.: 158,362

[52] U.S. Cl. ..........179/15 R

[51] Int. Cl. ..........H04j 3/00

[58] Field of Search ..........179/15 A, 15 AP, 15 AT, 179/15 BA, 15 BF, 15 R

[56] References Cited

UNITED STATES PATENTS

| | | | |
|---|---|---|---|
| 2,999,129 | 9/1961 | Lynch | 179/15 A |
| 3,310,779 | 3/1967 | Wagner | 179/15 BA |
| 3,585,307 | 6/1971 | Greenberg | 179/15 BF |

OTHER PUBLICATIONS

Texas Instruments Bulletin No. C-801 A January, 1965.

*Primary Examiner*—Ralph D. Blakeslee

*Attorney*—Woodling, Krost, Granger & Rust

[57] ABSTRACT

A multiplexer is disclosed including a transmitter system and a receiver system wherein each has a plurality of modules. The modules are aligned and held in a guide channel and electrically and physically interconnected by plug and socket interconnections. Each system has a main module and at least one extender module which may be interconnected at the plugs and sockets for physical and electrical extension of the entire multiplexer as desired. An end terminator electrically terminates the sequential scan of the input terminals in the development of the time multiplexed signals, and another end terminator electrically terminates the transmitter system in the receiver system in its distribution of the multiplexed signals to output terminals thereon. The variable number of extenders permit an expandable ring in which the input terminals may be scanned and to which the output terminals the time division multiplexed signals may be distributed. The foregoing abstract is merely a resume of one general application, is not a complete discussion of all principles of operation or applications, and is not to be construed as a limitation on the scope of the claimed subject matter.

30 Claims, 14 Drawing Figures

INVENTORS.
WERNER P.E. HUEBNER
ROBERT G. LONG.
BY Woodling, Krost, Granger and Rust
ATTORNEYS.

INVENTORS.
WERNER P.E. HUEBNER
ROBERT G. LONG
BY Woodling, Krost, Granger and Rust
ATTORNEYS.

INVENTORS.
WERNER P.E. HUEBNER
ROBERT G. LONG
BY Woodling, Krost, Granger and Rust
ATTORNEYS.

INVENTORS.
WERNER P.E. HUEBNER
BY ROBERT G. LONG
Woodling, Krost, Granger and Rust
ATTORNEYS.

INVENTORS.
WERNER P.E. HUEBNER
ROBERT G. LONG
BY Woodling, Krost, Granger and Rust
ATTORNEYS.

INVENTORS
WERNER P.E. HUEBNER
ROBERT G. LONG
BY Woodling, Krost, Granger and Rust,
ATTORNEYS.

INVENTORS.
WERNER P.E. HUEBNER
ROBERT G. LONG
BY Woodling, Krost, Granger and Rust
ATTORNEYS.

EXTENDABLE MULTIPLEXER

BACKGROUND OF THE INVENTION

Multiplexers are of various types, one of which is time division multiplex in which the signals are spaced at different times along the message train. In telegraphy and telephony as well as radio multiplexers, pulses or bits may be sent in a message train with each pulse sequentially transmitted conveying a desired bit of information in accordance with its time position in the message train.

In such time division multiplexed signals, many multiplexer transmitters have been hard wired; that is, permanently electrically connected to sequentially scan the input terminals. This might be analogous to a rotary stepping switch which sequentially scanned a fixed number of contacts e.g., 24 contacts to determine the open or closed condition thereon. In such case the multiplexer transmitter cannot increase nor decrease the actual number of contacts through which the rotary arm sweeps or scans. Accordingly, if only three different bits of information are required to be transmitted, e.g., barometric pressure, temperature and humidity, then there will be 21 dead or unused contacts through which the transmitter must scan before it again reaches the three contacts on which meaningful information is present. Worse still, if one has more than 24 input terminals to be transmitted, then the unit is totally unsuitable because it cannot be physically nor electrically expanded to permit sequential scan of these more than 24 sequential contacts, in this example.

Multiplexed signals are used wherein the transmission means such as telephone wires, coaxial cables or a part of the frequency spectrum of the ether is limited. The message train is accordingly multiplexed in time in order to transmit a multiplicity of switch condition information over a single message channel, be it a pair of conductors or a band of the frequency spectrum. The transmission means is generally over a long distance, otherwise if it was a short distance it could be more economical to use a multiple conductor cable in place of the multiplex. In view of the long distance, the double problems of fading signal strength and increased likelihood of interfering noise have caused the prior art inventors to concern themselves with this decreasing signal to noise ratio. The decreasing signal to noise ratio increases the requirement for some means to amplify the signal, but this also generally amplifies the noise. Accordingly, when the message train is received at the receiver system of the multiplexer, it is imperative to positively screen out noise pulses, as distinguished from signal pulses, in order to have an authentic reproduction of the transmitted message train. Different parity check systems have been devised in the prior art form of multiplexers but in general these have been highly complicated and expensive and have used mathematical coding which employed redundant data. This redundant data tended to fill up the message train making the actual message deliveries slower per unit of time without increasing the amount of useful information being transmitted.

Accordingly, an object of the invention is to provide a multiplexer which obviates the above-mentioned disadvantages.

Another object of the invention is to provide a multiplexer system which may be extended indefinitely without mathematical limit.

Another object of the invention is to provide a multiplexer with plug-in modules for physical and electrical extension of each of the transmitter and receiver systems.

Another object of the invention is to provide an end terminator to electrically terminate the sequential scan of the input terminals and to electrically terminate the sequential distribution of the multiplexed signals to the output terminals.

Another object of the invention is to provide a multiplexer which realizes a level of security in transmission and reception sufficient to permit widespread use without the need for mathematical coding employing redundant data.

Another object of the invention is to provide a multiplexer with transmitter and receiver systems, each system of which may be considered the electrical equivalent of a ring with modules added to the ring to extend it to any desired number of input terminals to be scanned, together with gate elements gated to disable the preceding module and to enable the next module in the ring.

Another object of the invention is to provide separate gates between each of the encoder devices in the transmitter with the gates being gated to initiate the scan of the input terminals on the next adjacent encoder of the transmitter system.

Another object of the invention is to provide an end terminator connected to the terminal one of the encoder extenders to terminate the scan and to reinitiate the sequential scan of the pairs of input terminals in the transmitter system.

Another object of the invention is to provide a multiplexer with transmitter and receiver systems comprised of modules which may be mass produced and tested easily because they do not require trimming or adjustment either at the time of production or during installation or use.

SUMMARY OF THE INVENTION

The invention may be incorporated in a multiplexer comprising, in combination, a transmitter system and a receiver system; said transmitter system having a plurality of input terminals thereon, output means on said transmitter system, multiplexing circuits within said transmitter system to transmit to said output means the electrical condition at said input terminals thereon, said receiver system including input means for receiving multiplexed information from said output means of said transmitter system, said receiver system having output means, multiplexing decoder circuits within said receiver system to receive and decode the signals and supply same to said receiver system output means to indicate the electrical condition of the input terminals on said transmitter system, one of said systems including a main module and at least one extender module, and connection means including complementary plug and receptacle means to electrically and physically connect said modules in sequence.

Other objects and a fuller understanding of this invention may be had by referring to the following description and claims, taken in conjunction with the accompanying drawings, in which:

DESCRIPTION OF THE PREFERRED EMBODIMENT

Figure 1:
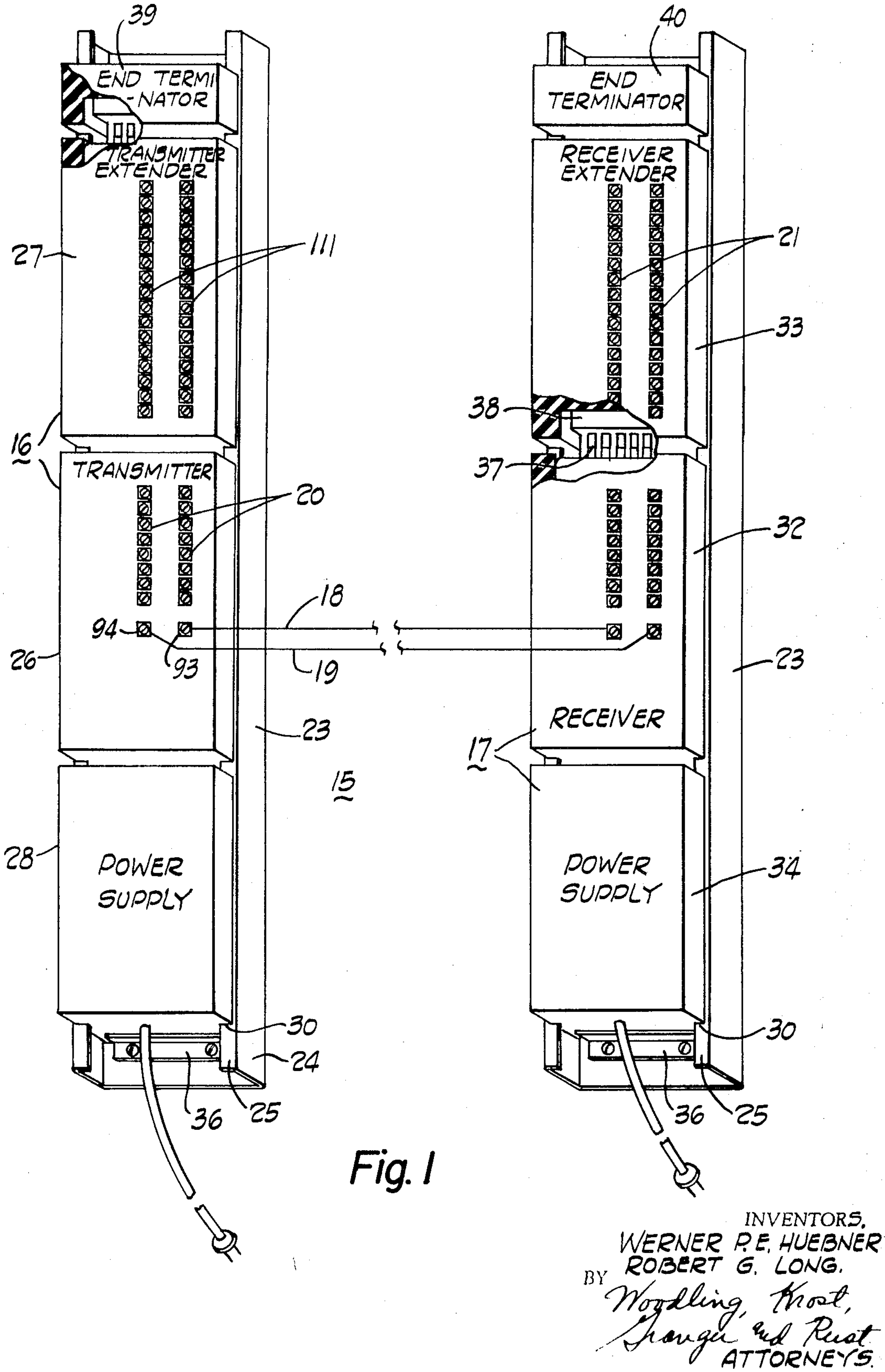
FIG. 1 is an isometric view of a multiplexer of the invention including a transmitter and a receiver system.

FIG. 1 is an isometric view of a multiplexer 15 embodying the invention. This multiplexer includes a transmitter system 16 and a receiver system 17 interconnected by transmission means 18, 19. The transmission means is illustrated as a pair of electrical conductors, for example, a telephone line. The transmitter system 16 has a plurality of input terminals 20 thereon. These input terminals are adapted to be connected to electrical apparatus or equipment, now shown, the electrical condition of which is to be transmitted over the multiplexer. For example, these input terminals 20 may be connected to motors, solenoids, switches and the like to indicate the electrical condition thereof. As a usual example, this is an open or a closed condition of some form of an electrical switch. The receiver system 17 has a plurality of output terminals 21 thereon and these are adapted to be connected to some electrical apparatus or equipment, not shown, to give a visual or aural indication of the electrical condition on the corresponding pair of input terminals. Multiplexing circuits are contained within the transmitter system 16 to transmit in time division multiplex a message train via the transmission means 18, 19 to the receiver system 17. Multiplexing decoder circuits are provided within the receiver system 17 to decode these time division multiplexed signals and to distribute them in the proper order to the output terminals 21.

The transmitter system 16 in this preferred embodiment has a metal guide channel 23 which is generally U-shape in cross-section as formed by legs 24 and the legs have inturned feet 25. Each system has a plurality of modules and in the transmitter system there is shown a transmitter main module 26, a transmitter extender module 27 and a transmitter power supply module 28. Each of these modules has a longitudinal groove 30 in which the feet 25 may slide to align and laterally retain the modules within the guide channel 23. The receiver system 17 includes a receiver main module 32, a receiver extender module 33 and a receiver power supply module 34. A channel 23 may be provided for the receiver system 17 and again inturned feet 25 engage grooves 30 on the longitudinal edges of these receiver modules. An L-shaped bracket 36 may be secured to the channels 23 against which the modules may rest for longitudinal support of the modules in their respective channels. Multiplexing circuits are provided within each of the modules. Connection means are provided between modules in a system. This connection means includes complementary plug and receptacle means including plug means 37 and receptacle means 38 to electrically and physically connect the modules in sequence. These plug and receptacle means provide a conduction of operating power from the power supplies and also various signals as a part of the complete circuit for the time multiplexed message train. A convenient form of the modules is that they contain circuit boards commonly known as printed circuit boards with male connector plugs on one end thereof and female receptacle plugs on the other end thereof. This permits the electrical and physical interconnection of the modules in an integrated sequence. The modules are aligned by the channels 23 and laterally retained therein. The grooves 30 and feet 25 establish that the modules may be moved longitudinally to plug them together or to disconnect them. Also the metal channel legs 24 may be elastic so that they may be sprung apart so that another extender module may be added or removed as desired.

A transmitter end terminator 39 is provided as is a receiver end terminator 40. Each of these end terminators has internal electronic components and a complementary plug or receptacle means selectively connectable with the end one of the sequence of modules to electrically terminate the modules in transmitting or receiving multiplexed information. As shown in FIG. 1 each end terminator has a complementary receptacle, however, if the power supply units were to have the receptacles and the modules were so constructed in a reverse configuration, then the end terminators would have male plugs thereon. The plug and receptacle means are multiple conductor devices to provide the necessary connection of the several electrical interconnections required.

Each of the transmitter modules except for the power supply has a plurality of the input terminals 20 thereon. These are provided on the exposed face of the modules for easy connection to the equipment being monitored or controlled. The number of extenders in the transmission system and the corresponding number of extenders in the receiver system may be increased without mathematical limit. The main transmitter module 26 has eight input terminals 20 in this preferred embodiment and each transmitter extender has 16 input terminals. In a similar manner the main receiver module 32 has eight output terminals 21 and each receiver extender module 33 has 16 of these output terminals 21.

The transmission means 18, 19 as shown in this preferred embodiment of FIG. 1 is also connected to properly identified output terminals 93 and 94 on the exposed face of the main modules. The internal electronic circuitry in this preferred embodiment is quite small and each module accordingly becomes in effect a portion of an extendable terminal strip. Easily used screw terminals 20 have been provided on this preferred embodiment for connection to the external switches or equipment. As a result, the transmitter system is an easily extendable terminal strip extending along the length of the channel 23. Similarly, the receiver system 17 is also an extendable terminal strip.

The output terminals 21 thus may be connected to a row of indicator lights, as an example, to indicate the condition of the respective pairs of input terminals.

The channel guide means includes complementary tongue and groove means and in the preferred embodiment the tongue or inturned foot 25 is on the channel 23 and the groove is on the modules. The transmitter system 16 includes a means to scan the input terminals to determine the electrical condition thereof, and the receiver system 17 includes a means to distribute this multiplexed signal to the corresponding pairs of output terminals. The guide means in the channel is aligned parallel to the electrical connection means in the plug and receptacle means 37, 38.

Figure 2:
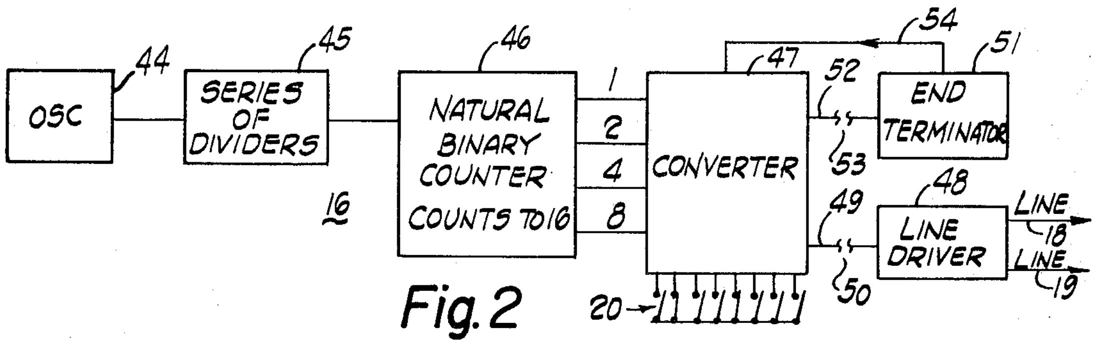
FIG. 2 is a block diagram of the transmitter system.

FIG. 2 is a block diagram of the transmitter system 16. In this transmitter system there is provided a means to develop a scanning frequency. This is a high frequency oscillator 44 leading through a series of dividers 45 to reduce the frequency to a lower scanning frequency. This scanning frequency may be of any suitable value, for example, from 25 to 500 bits per second, or pulses per second. The scanning frequency is supplied to a natural binary counter 46 which counts to 16 on four lines 1, 2, 4 and 8. This natural binary counter 46 has outputs of either zero or a one logic level which is either a low or a high logic level on these lines 1, 2, 4 and 8. For example, when all four lines are low, this is a zero. The first line high and the remaining low is a one, the second line high and the remaining low is a two, the first two lines high is a three and so on up through all four lines being high which is a 15. Zero through 15 is counting in the scale of 16, just as zero through 9 is the decimal scale. These lines 1, 2, 4 and 8 supply the natural binary code to a converter 47 which also may be considered an encoder. This converter 47 converts the natural binary code to a decimal or actually to an octal code. The function of the converter is to utilize the scanning frequency, as applied on lines 1, 2, 4 and 8 to sweep or scan the plurality of input terminals 20. On this converter 47 there are eight such pairs of input terminals 20 corresponding to the transmitter main encoder module 26 shown in FIG. 1. Again as described for FIG. 1 these input terminals 20 may be connected to some controlling device or apparatus to be monitored.

Figure 3:
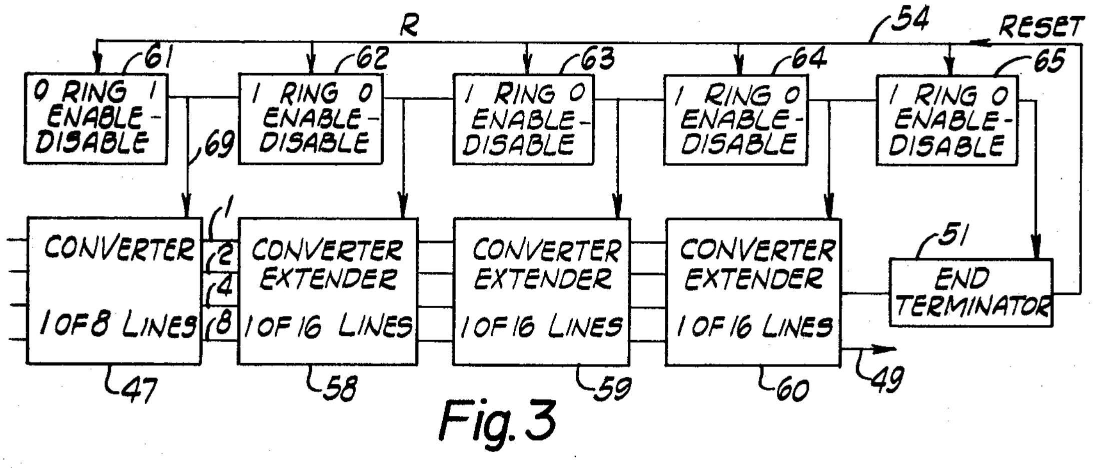
FIG. 3 is a block diagram of the extenders usable in the transmitter system.
Figure 5:
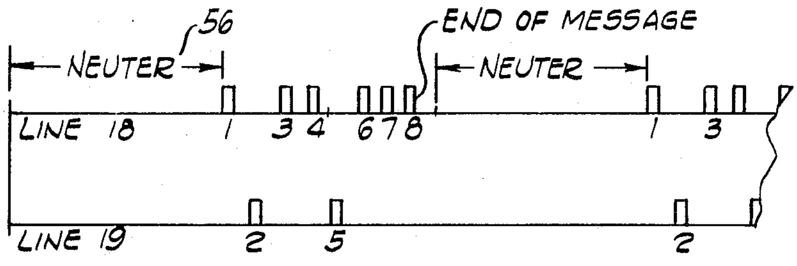

The converter 47 is a part of an encoder means to encode the condition of the input terminals 20 into a multiplexed signal and to apply them to the transmission line 18. This is done via a line driver 48 from the converter 47 through a line 49 and through a break in the line 50 into which break in the line may be inserted one or more encoder extenders. These encoder extenders or converter extenders are shown in FIG. 3, as explained below. Referring to FIG. 2, the converter 47 also has an output to an end terminator 51 via a line 52 and through a break in the line 53, which indicates additional converter extenders may be inserted, as shown in FIG. 3. The end terminator 51 has an output on a reset line 54 to reset the converter 47. This reset signal on the reset line terminates the scan of the input terminals 20 and reinitiates the scan of the series of input terminals. Thus as shown in FIG. 2, if there are only eight terminals, there will be only eight bits in the message. This is as shown in FIG. 5. There is a neutral or neuter period 56 between each message train. In FIG. 2 the second and fifth of the switches diagrammatically illustrated across the input terminals 20 are closed. Accordingly in FIG. 5 this is represented by pulses or bits on line 19 whereas the first, third, fourth, sixth, seventh and eighth switches are open, as indicated by the pulses or bits on line 18 of FIG. 5.

FIG. 3 indicates the converter extenders which are a part of the encoder means. The main encoder is the main converter 47 of FIG. 2 whereas encoder extenders or converter extenders are also illustrated in FIG. 3. These may be replicas of the transmitter extender modules 27 plugged in one after the other, as many as are required to provide the necessary number of input terminals 20. FIG. 3 shows the converter 47 plus three converter extenders 58, 59 and 60. As a part of the transmitter main module 26, the converter 47 is provided, but in addition, a gate 61 is provided which in FIG. 3 is labeled a ring enable-disable unit. A gate 62 is also provided in connection with the converter 47 along with gate 61. Gates 63, 64 and 65 are provided in connection with each of the converter extenders 58, 59 and 60, respectively.

Figure 4:
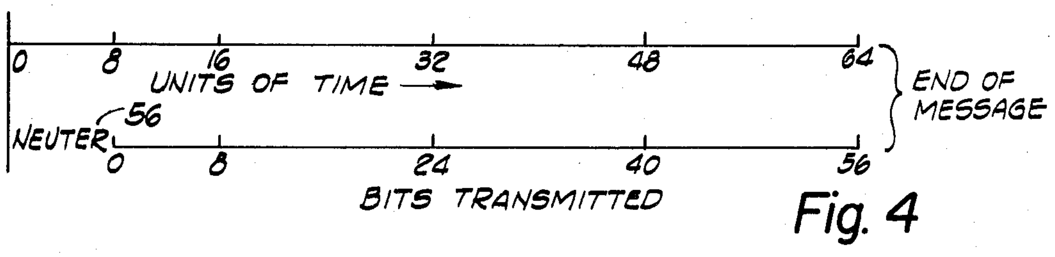
FIGS. 4 and 5 are graphs of the bits or pulses transmitted in the message train.

FIG. 4 helps explain the operation of the transmitter system as so far described. FIG. 3 shows three converter extenders each marked one of 16 lines. Each of these converter extenders, therefore, is like one of the transmitter extender modules 27, which has 16 pairs of input terminals 20. Three times 16 is 48 plus eight pairs of terminals in the main transmitter module 16 or main converter 47 will be a total of 56 pairs of input terminals. This is illustrated in FIG. 4 where 56 bits or pulses are transmitted until the end of message. There is a neuter period 56 again which occurs between message trains and in this case is shown at the beginning of the message. Therefore, there will be 64 units of time during which 56 bits of information are transmitted in the message train. This means that the transmitter system will utilize the oscillator 44 and series of dividers 45 to develop a scanning frequency. The natural binary counter 46 changes this to a natural binary code along the lines 1, 2, 4 and 8. The converter 47 is an encoder which utilizes the scanning frequency to sequentially scan the pairs of input terminals 20. In the case of FIG. 3 this will be a total of 56 pairs of terminals to be sequentially scanned. The converter is an encoder to encode this information into a time multiplexed signal and supply it through the line driver 48 to the transmission lines 18, 19. Accordingly, on this transmission line there will be a message train indicating the condition, either open or closed, of the pairs of input terminals 20. As shown in FIG. 5, line 19 may have thereon bits or pulses corresponding to those of the switches which are closed and line 18 may have bits or pulses thereon corresponding to the switches which are open. Switches in this case are considered the equivalent of the electrical condition across each of the pairs of input terminals 20.

The gates 61–65 shown in FIG. 3 may be further explained by stating that they perform and AND gate function. It will be noted that each of the gates 61–65 has a zero and a one at opposite ends of such gate. These are the low and high logic level conditions as will be explained hereinafter. Gate 61 has a high output connected to the high output of the adjacent gate 62. Accordingly, on line 69, the converter 47 is enabled. These low and high logic levels of the gates 61–65 are the condition which obtains upon reset, when the entire transmitter system 16 is ready to scan the input terminals 20 from the beginning. For the purposes of this patent an AND gate shall be defined as a logic element wherein when all inputs are high, the output is high, and conversely any low on an input makes the output low. Broadly speaking an AND gate function may be achieved by a NAND gate, which simply is an AND gate followed by an inverter. Accordingly in a NAND gate when all inputs are high, the output is low and conversely any low on an input makes the output high. This output signal from the gates, whether an AND or a NAND gate, can enable the converter 47 whenever the two inputs thereto from gates 61 and 62 are a high.

After the first eight pairs of input terminals are scanned, the gate 62 if flipped, and for this purpose may be considered a flip-flop. Accordingly, the first converter 47 of the ring is disabled and the next converter extender 58 of the ring is enabled. Enabling of this extender 58 permits the scanning frequency to scan all 16 pairs of input terminals in sequence and at the termination thereof the gate 63 is flipped to disable extender 58 and to enable extender 59. The 16 pairs of input terminals therein are scanned in sequence and at the end, the gate 64 is flipped to disable extender 59 and enable extender 60. The scanning frequency scans the 16 pairs of input terminals therein and at the end of this scan the gate 65 is flipped to disable extender 60. This is the last extender in this ring, in this particular example, although more extenders may be added as desired. In this case as shown in FIG. 3, the end terminator 51 thus receives a signal and the internal electronic components thereof send a reset signal on the reset line 54. This flips all of the flip-flops resetting them to the original condition shown in FIG. 3. Accordingly, the scan of the converter 47 and converter extenders 58, 59 and 60 will be reinitiated. In this manner a message train is sent with 56 bits of information transmitted in the message train in 64 units of time. With a scanning frequency of 200 bits, for example, the entire message train is transmitted in less than one-third of a second.

Figure 6:
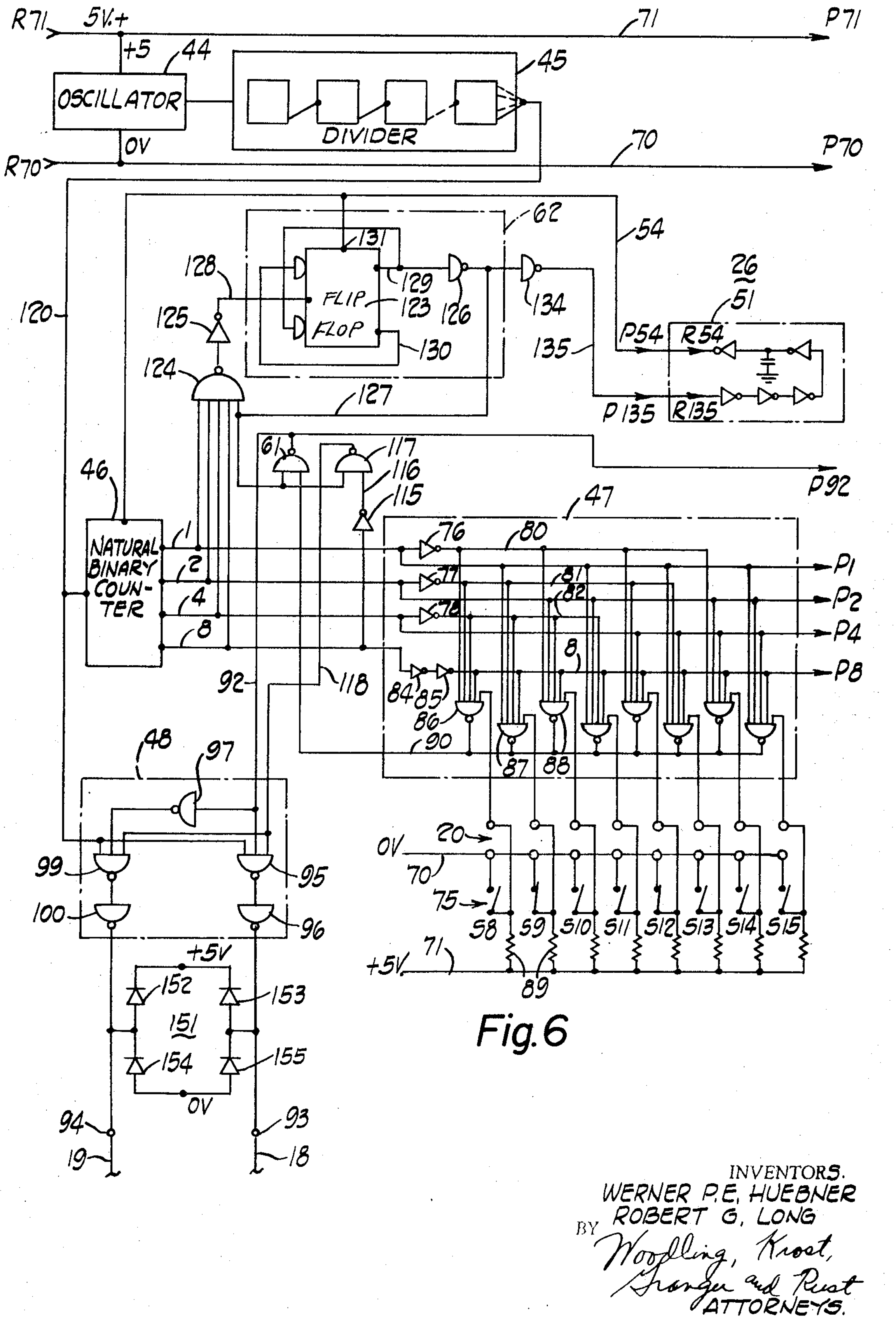
FIG. 6 is a schematic diagram of the main transmitter module.
Figure 7:
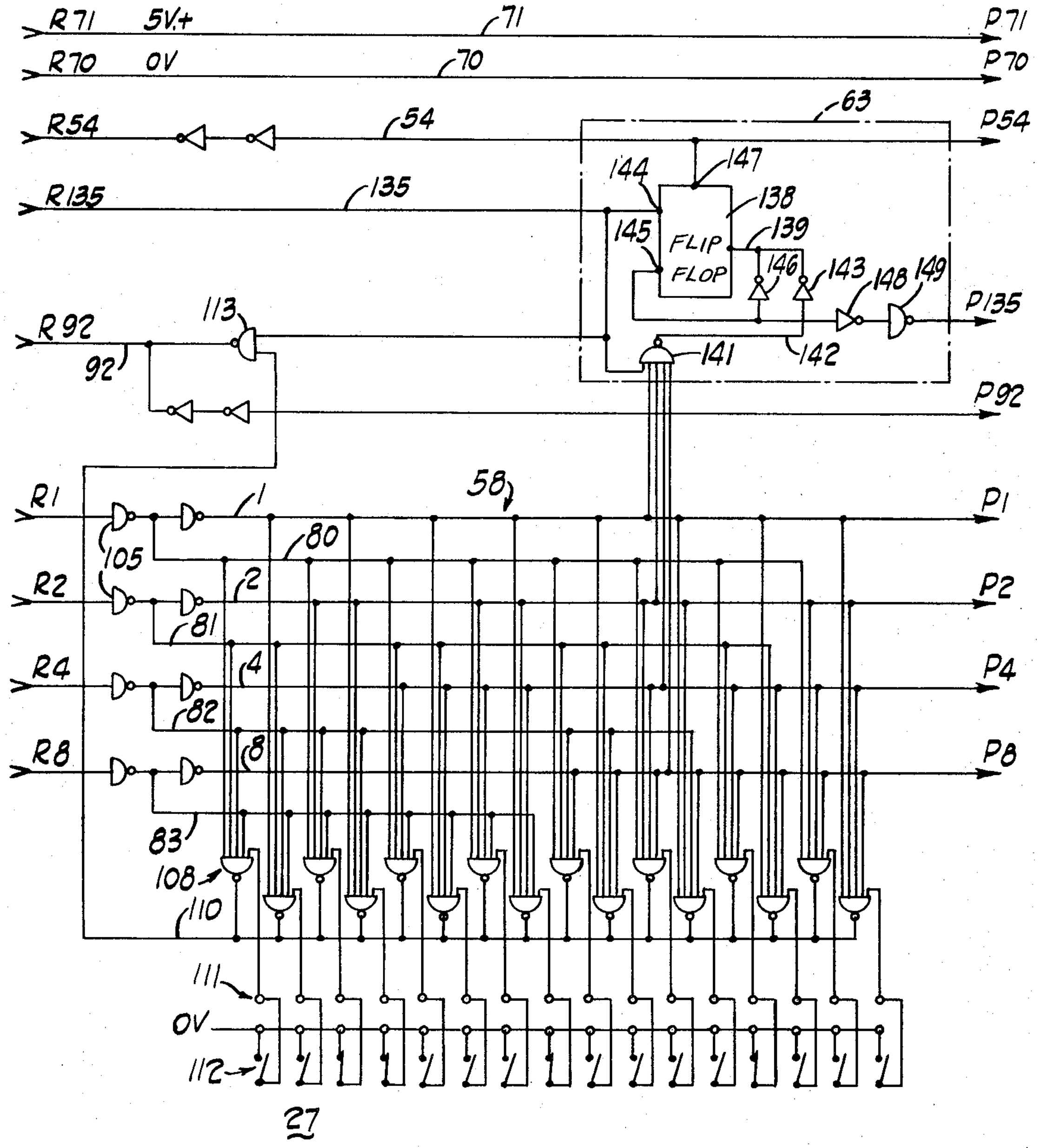
FIG. 7 is a schematic diagram of one of the transmitter extender modules.

FIGS. 6 and 7 illustrate schematically a preferred embodiment of a transmitter system 16. The FIG. 6 by itself illustrates schematically the components which may be included in the main transmitter module 26. The oscillator 44 and series of dividers 45 are again provided as in FIG. 2. The scanning frequency developed at the output of the divider 45 is applied to the natural binary counter 46 at which has an output on lines 1, 2, 4 and 8. These lines lead to the converter 47 and also to plugs P1, P2, P4 and P8 connected to the lines 1, 2, 4 and 8, respectively. These are male plugs to connect into the respectively numbered complementary receptacles R1, R2, R4 and R8 shown on FIG. 7. The converter 47 is shown as having a means to encode the electrical condition of a series of eight input terminals 20. These may be the same as the input terminals 20 on FIG. 1. A series of switches 75 are shown connected across each of these pairs of input terminals 20 and for convenience and explanation the second and fifth of these switches is shown closed to coincide with the explanation of FIGS. 2 and 5.

The oscillator 44 is shown connected between a pair of lines 70 and 71 which provide operating voltage. Line 70 is zero volt line and line 71 is that which provides logic level one or a high level. In this instance it is illustrated as being five volts plus. These lines 70 and 71 also provide operating power to the remainder of the transmitter system 16 such as to the divider 45, the natural binary counter 46 and the converter 47. These connections are not shown in order to avoid complication in the drawing. Line 70 and 71 are connected to plugs P70 and P71, respectively, to supply DC operating power to the next module which will be the transmitter extender module 27 as shown in FIG. 7. Also these lines 70 and 71 are connected to receptacles R70 and R71, respectively, to receive operating power from the transmitter power supply 28 shown in FIG. 1.

The converter 47 includes a series of gates for converting the natural binary code on lines 1, 2, 4 and 8 into a hexadecimal code or in this case, an octal code since only eight pairs of terminals are to be scanned. Within the converter 47, inverters 76, 77 and 78 are provided to establish an inverted pulse condition on lines 80, 81 and 82, respectively. Two inverters 84 and 85 in series are connected to line 8 and thus this double inversion establishes the same logic level condition on the output; namely, at plug P8, as on the input to these inverters. The purpose being to provide isolation or buffering and also to provide a means to increase the power level from the DC operating voltage source, so that the line is not loaded down. A group of multiple input gates including NAND gates 86, 87 and 88 are provided each having an output to a different pair of output terminals 20. It has previously been stated that three is a neuter period 56 for the first eight bits; namely, with a count of zero through seven. At the count of eight through fifteen, the condition of the switches S8 through S15 is scanned. Accordingly, on the eighth bit, the line 8 will be high and lines 1, 2 and 4 will be low. This means there will be a high on lines 80, 81 and 82 as well as line 8 and hence, four of the five inputs on NAND gate 86 are high. Now if switch S8 were closed, this would be a low because the switches are tied to a zero volt logic level line 70. Switch S8 is shown as being open and in such case, the switch S8 provides another high input to the NAND gate 86. With all high inputs to NAND gate 86, the output to a line 90 will be low. Accordingly, the condition of the switch S8 has been scanned on the count of 8. Had the switch S8 been closed, this would be a low input to NAND gate 86 establishing a high on the output line 90. Each of the switches S8 through S15 may be connected through resistors 89 to the high logic level line 71, if desired, in order to positively establish this high input condition on the gates 86, 87 and 88.

Next, at the count of 9, lines 1 and 8 will be high and lines 2 and 4 will be low. Conversely, lines 81 and 82 will be high and this means that four of the five inputs on NAND gate 87 will be high. Accordingly with switch S9 closed, this is a low, and the output of gate 87 on line 90 will be high. If switch S9 were open, then all inputs to gate 87 would be high and this would be a low output on the line 90.

Next, at the count of ten, lines 2 and 8 are high and line 1 and 4 are low and which means lines 80 and 82 will be high. This establishes a high condition on four of the five inputs to NAND gate 88 and accordingly the condition of the fifth input whether high or low will govern the low or high condition, respectively of the output of gate 88 to the line 90. The sequence of scanning through the eight gates in the converter 47 proceeds in the same way as formerly described so that each of the eight NAND gate is enabled in turn. This means that the eight input terminals 20 are sequentially scanned and the electrical condition thereof is supplied as a time multiplex signal along the line 90.

The time multiplexed signals on line 90 are supplied through the ring enable-disable gate 61 shown as a NAND gate to a line 92 and through the line driver 48 to transmission line terminals 93 and 94. These latter terminals may be connected to the transmission lines 18 and 19, respectively. The line driver 48 includes NAND gates 95 and 96 which form a double inversion of the signal on line 92. This line driver also includes a NAND gate 97 to form a single inversion of the signals on line 92. The signals from gate 97 pass through to NAND gates 99 and 100 in series for a double inversion before passing to the transmission line terminal 94. The NAND gate 97 establishes the fact that on terminal 94 or transmission line 19 there is an inverted sequence of bits or pulses compared to the pulses on the transmission line terminal 93, transmission line 18. Referring to FIG. 5, for example, in comparison with FIG. 6, one will note that switch S8 is open. This puts a high input on NAND gate 86 for a low on line 90, a high on line 92 and a high on transmission line terminal 93 or transmission line 18. At the same time there is a low on the opposite transmission line 19. This agrees with the bits shown in FIG. 5. Now in FIG. 6 the switch S9 is shown closed establishing a low on an input to NAND gate 87, hence a high on line 90, a low on line 92 and consequently a low on line 18. Because of NAND gate 97 there will be a high on transmission line 19 and this agrees with FIG. 5.

FIG. 6 shows the electronic circuit components within the main transmitter module 26 and FIG. 7 shows the electronic circuit components within the transmitter extender module 27. In this FIG. 7 it will be noted the receptacles R1, R2, R4 and R8 into which are plugged the plugs P1, P2, P4 and P8 at the time that an extender module 27 is plugged into the main transmitter module 26. This supplies on the lines 1, 2, 4 and 8, the scanning frequency as converted to the natural binary code. Also because of the inverting gates 105, the lines 80, 81, 82 and 83 will have pulses thereon the inverse of those on lines 1, 2, 4 and 8, respectively. These eight lines supply the converter extender 58 which acts in a manner similar to the converter 47. This converter extender 58 converts the natural binary code on lines 1, 2, 4 and 8 into a hexadecimal code or base 16 code by means of a series of 16 NAND gates 108. Each of these NAND gates 108 is enabled in sequence just as were the NAND gates 86, 87 and 88 etc. in the converter 47. Accordingly, by the sequential enabling the these NAND gates 108, there appears on an output line 110 pulses corresponding to the electrical condition of the series of 16 output terminals 111. Again a group of switches 112 have been shown as connected across these pairs of output terminals 111 with some closed and some opened to indicate an electrical apparatus for equipment which is being monitored as to condition thereof by this transmission system 16. The pulse signals on line 110 pass through a NAND gate 113 to receptacle R92. This receives plug P92 in the main transmitter module 26 of FIG. 6. Plug P92 is connected to line 92 in order to supply the signals to the line driver 48 and hence out to the transmission lines 18 and 19.

The gates 61, 62 and 63 of FIG. 3 are now described in more detail in order to show how the converter 47 is first enabled in order to scan the first eight pairs of input terminals, then it is disabled and the converter extender 58 is enabled in order to sequentially scan the next 16 pairs of input terminals. The neuter period 56 is established by NAND gate 115 connected through a conductor 116, NAND gate 117 and conductor 118 to be an input to each of the gates 95 and 99 in the line driver 48. It will be appreciated that during the first eight counts from the natural binary counter 46, line 8 is low hence 116 is high and line 118 is low. This is a low input on the NAND gates 95 and 99, disabling them and maintaining both transmission lines 18 and 19 low for this neuter period 56.

Line 120 from the output of the divider 45 contains the pulses at the scanning frequency. These are pulses on and off at approximately equal intervals. This line 120 is also applied as an input to the gates 95 and 99 in the line driver 48. Accordingly, when this line 120 goes high, at the scanning frequency rate, then both gates 95 and 99 are enabled. When the line 120 goes low, then this disables both gates 95 and 99 to hold both phone lines 18 and 19 low. This is a safety feature making sure that no noise pulses can be transmitted as a pulse on the lines 18 and 19 except during the high periods of the pulses at this scanning frequency rate.

Now during the second group of eight units of time, FIG. 4, the first group of eight input terminals are scanned and transmitted at the beginning of the message. Line 8 is high at this time to enable the gates 95 and 99. The gate 62 includes a clocked flip-flop 123 and an inverting gate 126. Also associated with gate 62 is a plural input NAND gate 124, an inverter 125 and an inverting gate 134. The plural input NAND gate 124 has four inputs from the lines 1, 2, 4 and 8 and at the count of fifteen, which is the last of the first 16 units of time, all these lines will be high to enable the gate 124, if an input line 127 is high. Gate 124 feeds through inverting gate 125 to a line 128 which is the toggling input line to the clocked flip-flop 123. This clocked flip-flop has what is normally termed a set output at a line 129 and a reset output at a line 130. The reset line 54 which resets everything in the transmitter system 16, is connected to a reset input 131 which overrides all other signals to reset the flip-flop to a condition whereat output 129 is low and accordingly, output 130 is high. Output line 129 is thus normally low for the first 16 units of time. In passing through the inverting gate 126 this makes line 127 high for the first 16 units of time. Accordingly, when the count of 15 is first reached, this will be the beginning of the 16th unit of time. At this instant all of the inputs to NAND gate 124 are high, the output thereof is low and the inversion thereof by gate 125, means lines 128 goes high. At the end of this incoming pulse, the pulse goes from high to low and this toggles the clocked flip-flop 123 so that now line 129 becomes high and line 130 becomes low. Line 129 going high makes line 127 go low and this freezes the gate 124 for the remainder of the message train. Gate 124 will then have a high output and line 128 will remain low for the rest of the message train.

Line 127 has been high for the first 16 units of time but it goes low thereafter for the rest of the message train and this may be considered an output from the gate 62. The line 127 is supplied to the inverting gate 134 and then to a line 135 which goes to a plug P135. This plug will engage a receptacle R135 in the transmitter extender of FIG. 7 or alternatively it may engage a receptacle R135 in the end terminator 51, shown on FIG. 6. If the message train is only the eight bits indicating the condition of the terminals on the main transmitter module; that is, if no extenders are used and the end terminator 51 is plugged directly into the transmitter module 26, then reset of everything in the transmitter system will occur. Line 127 was high for the first 16 units of time which means line 135 will be low. Now at the end of the first 16 units of time, this means that the terminals in the main transmitter module will have been scanned in sequence. With the end terminator plugged in, the line 135 goes high at the end of this scan and this high pulse passes through five inverting gates 136 in series which is equivalent to inverting it once so that it comes out on a receptacle R54 to a plug P54 and to line 54 as a low. This line 54 is normally high and only goes low for a reset. Therefore, this low condition resets the clocked flip-flop 123 and also resets the natural binary counter 46 ready for another message train.

Now if the end terminator 51 is unplugged and the transmitter extender 27 of FIG. 7 plugged into the main transmitter module 26 of FIG. 6, the scan of the message train is not completed. As stated above, the line 135 goes high at the end of the first 16 units of time. This appears as a high on receptacle R135 and this is applied to the gate 63 in FIG. 7. Specifically the gate 63 includes a clocked flip-flop 138 which has a toggling input at a line 139. This low condition on line 135 for the first 16 units of time is applied to gate 113, and this low maintains a high output thereon so that this gate is disabled for the first 16 units of time. Accordingly, the converter extender 58 has no output during this first 16 units of time even though the sequential scan of the output terminals 111 appears on the output line 110. Line 135, however, goes high at the end of the first 16 units of time and this enables gate 113 so that the sequential scan of the output terminals 111 will appear as bits 8 through 23 during the units of time 16 through 31. These bits as a part of the message train will appear on the output of gate 113, which is line 92, and be passed to the main transmitter module 126 of FIG. 6 to go through the line driver 48 to the transmission lines 18 and 19.

At the end of the second sixteen units of time, lines 1, 2, 4 and 8 will be high, making all high inputs on a multiple input NAND gate 141 causing the output at a line 142 to go low and through an inverter 143 causing the toggling input 139 to go high. This occurs in synchronism with the 23rd bit and when the end of this square pulse occurs, the toggling of the clocked flip-flop 138 occurs to drive the output at 144 low and the flip-flop output at 145 high. This high output is inverted by an inverting gate 146 to maintain the toggling input 139 low and this locks this flip-flop in this condition for the remainder of the message train until reset by a low pulse on the reset line 54 at the reset input 147.

Flip-flop output 145 has been low during the second sixteen units of time which means a low through the inverting gates 148, 149 at the plug P135. At the end of this second sixteen units of time, however, the plug P135 goes high and this enables the next extender which may be plugged into the extender 27 of FIG. 7. Again if the end terminator 51 is plugged in rather than another extender, this high condition on plug P135 will act through the end terminator and establish a low at receptacle R54 for a low on the reset line 54. This resets the flip-flop 138 and resets everything in the main transmitter module 26 of FIG. 6.

Additional transmitter extenders may be added without mathematical limit each being enabled in turn in order that the scan of the input terminals thereon will be transmitted along the line 92 to the transmission lines 18 and 19. The last one of the transmitter extenders will have plugged thereinto the end terminator 51 in order to terminate the scan and to reinitiate the scan from the beginning.

RECEIVER SYSTEM

FIG. 1 shows the receiver system 17 and FIGS. 8, 9, 13 and 14 show schematically the circuitry involved in this receiver system 17. The power supply 34 is shown in FIG. 1 but is not shown in FIGS. 8 and 9.

Figure 8:
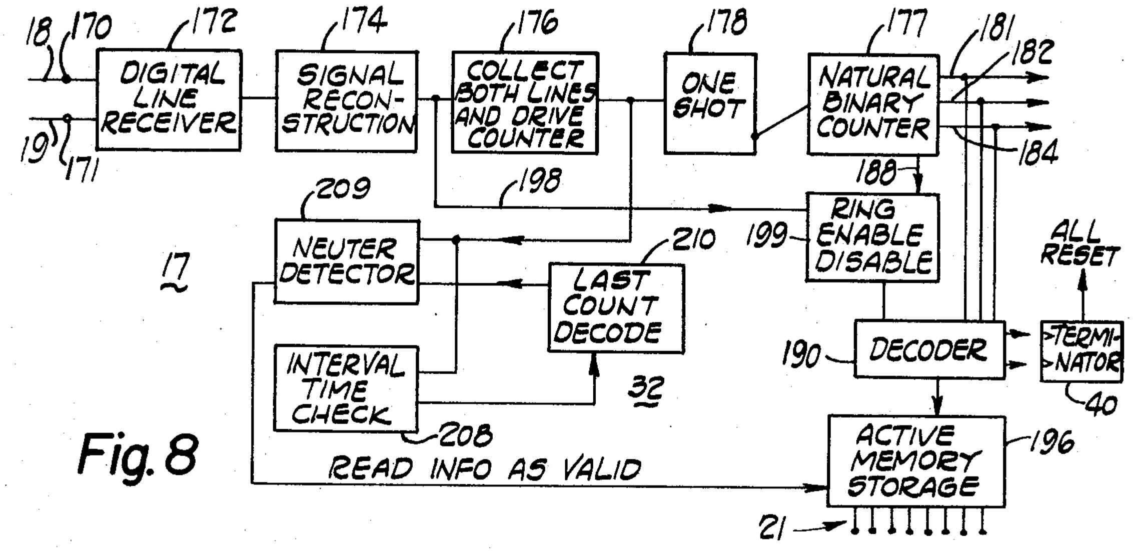
FIG. 8 is a block diagram of the main receiver module.
Figure 9:
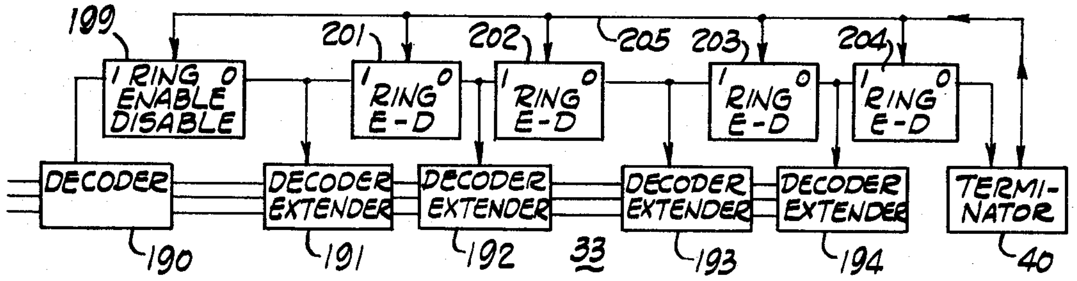
FIG. 9 is a block diagram of the receiver extender modules.

FIGS. 8 and 9 show a block diagram of the receiver system 17 with the main components shown in FIG. 8 for the main receiver module 32 and shown in FIG. 9 for the receiver extender module 33. In FIG. 8 the transmission line 18 and 19 is connected to input terminals 170 and 171 of the receiver system 17 and more specifically of the digital line receiver 172. The signals on the transmission line 18 and 19 actually may be considered as having a ternary form and the digital line receiver changes this to a binary output supplied to a signal reconstruction unit 174. If the transmission line is the usual telephone line, for example, there may be repeaters or other inductive effects in the line which badly distort the square wave pulses as originally transmitted from the transmitter system 16. Accordingly, the signal reconstruction unit 174 reshapes these pulses to obtain generally a square wave. Next these pulses are applied to a collector 176 which collects both sets of pulses on the two lines and drives a counter 177 through a one-shot multivibrator 178. The counter 177 is a natural binary counter capable of counting up to sixteen on four lines which have a numerical value of 1, 2, 4 and 8 and these lines are designated 181, 182, 184 and 188, respectively. The output from the natural binary counter is supplied to decoder means including a decoder 190 in the main receiver module 32 of FIG. 8 and one or more decoder extenders 191–194 shown in FIG. 9. An active memory storage 196 receives the decoded information from the decoder 190 and after it has been determined to be valid information, it is then released to a plurality of output terminals 21. Each decoder extender is also provided with a plurality of output terminals via an active memory storage and this active memory storage may be broadly considered as a part of the decoder or decoder extender.

The actual signals are supplied from the signal reconstruction unit 174 via a channel 198 through a gate means 199 whcih may also be considered a ring enable-disable unit. If this gate means is open and the signals pass to the decoder 190, the natural binary counter 177 causes these signals to be distributed in sequence to the output terminals 21. If no decoder extender is used, then the end terminator 40, see FIG. 1, is plugged into the main decoder 32 of FIG. 8. This has an output which is an all reset, meaning that it resets all of the circuits in the receiver system 17.

FIG. 9 shows an alternative configuration of one or more decoder extenders plugged into the decoder 190. This is similar to the illustration in FIG. 1 wherein a receiver extender 33 is plugged into the main receiver 32. FIG. 9 illustrates a ring enable-disable unit 199 associated with the main decoder 190 and this is a part of the main receiver module 32. FIG. 9 also shows a decoder extender 191 and 192 together with ring enable-disable gates 201 and 202. These four devices would be the main components in a receiver extender module 33 and as shown more completely in schematic diagram in FIG. 14. FIG. 9 shows still other optional decoder extenders 193 and 194 together with the associated ring enable-disable gates 203 and 204 and these would be the main components of the next adjacent receiver extender module which might be plugged into the receiver extender module 33 of FIG. 1. The end terminator 40 is electrically and physically attached to the terminal one of the receiver extender modules. The ring enable-disable gates 199–204 enable the ring in sequence and the ring is expandable without mathematical limit. This sequential enabling of the ring extends in only one direction and this means that with a particular message train the pulse bits are first distributed to the first group of eight output terminals 21 of the decoder 190 via the active memory storage 196. The next group of eight pulse bits in the memory storage are distributed by the decoder extender 191. The third, fourth and fifth groups of eight pulse bits are sequentially distributed by the decoder extenders 192, 193 and 194 to the corresponding pairs of output terminals 21. In the example shown in FIG. 9 this is the end of the receiver system and the last ring enable-disable gate 204 then passes a signal to the end terminator 40 whereupon the reset line 205 has a reset pulse thereon to reset the entire receiver system 17. This terminates the distribution to all of the output terminals for this message train and reinitiates the distribution to the output terminals starting again with those associated with the decoder 190.

The active memory storage 196 is a temporary memory storage having storage devices equal in number to the number of pulses in a message train received by the receiver system. Each memory storage device has a master and slave section. The decoder means 190 applies the decoded signals from the reconstruction unit 174 in sequence to the master section of the storage devices. The signals are transferred to the slave section which is the output terminals 21 at the completion of each message train.

Checking means are provided in the receiver system 17 to check the authenticity of the received signals and to emit a check signal. This check signal activates the memory storage to transfer the stored information from a master section to the slave section and thus to the respective output terminals of the receiver system 17. This checking means is shown in FIG. 8 as an interval time check unit 208. This interval time check is a means to eliminate noise pulses or to eliminate false information caused by noise or other extraneous signals. As shown in FIG. 5 there was a neuter period 56 at the beginning of each message train and the receiver system 17 has a neuter detector 209 to detect this neuter period which is at the end of the message. The neuter detector 209 receives an input from the collector 176. A last count decode gate 210 receives an input from the decoder 190 at the time of decoding the last count in the message train. This decode gate 210 also has an input from the interval time check unit 208 and the decode gate 210 has an output to the neuter detector 209 so that this provides the means to emit a check signal to activate the memory storage 196 to transfer the stored information from the master sections to the slave sections and thus to the respective output terminals 21 of the receiver system 17.

Figure 13:
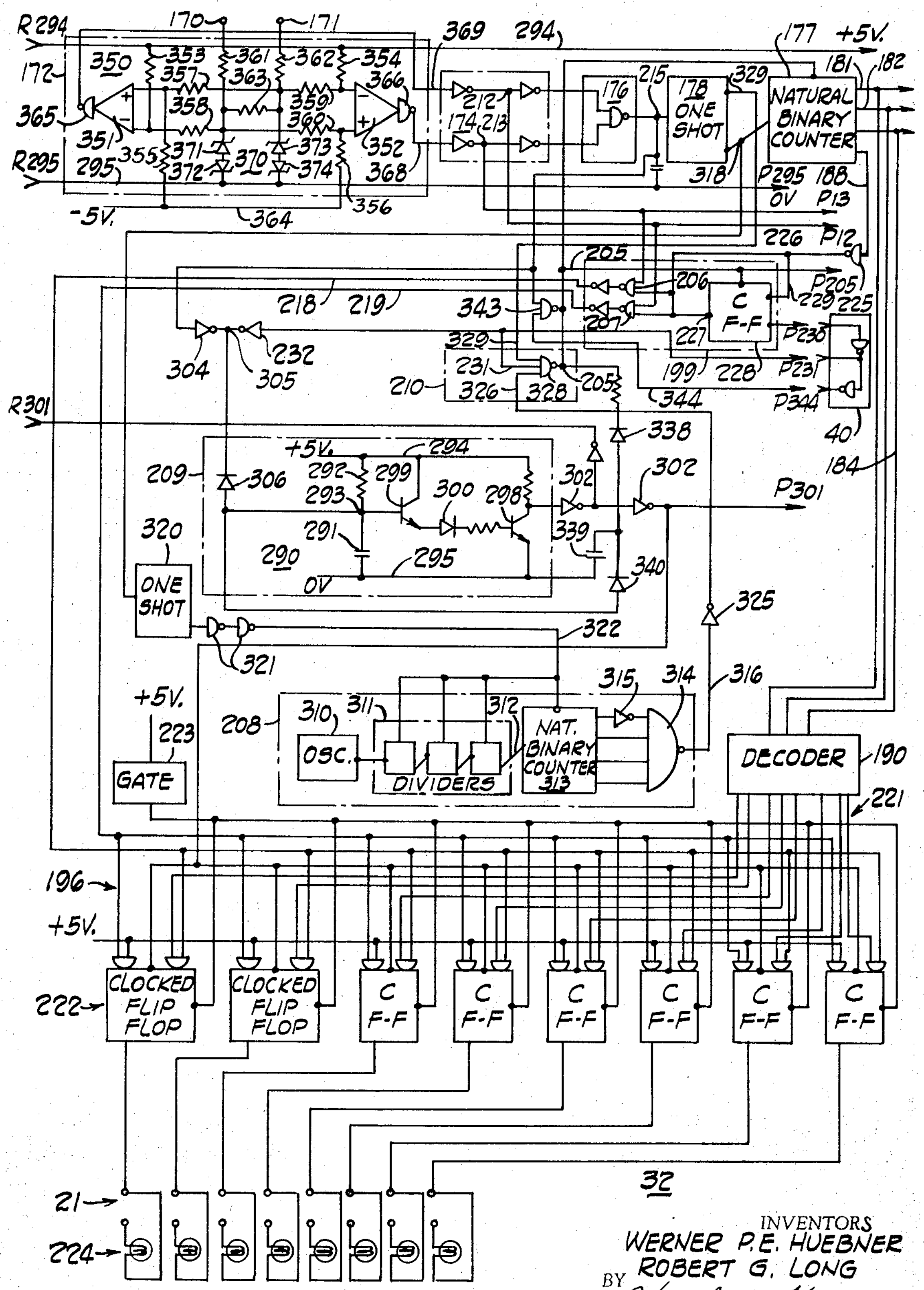
FIG. 13 is a schematic diagram of the circuit in the main receiver module.

FIG. 13 shows schematically the components within the main receiver module 32 of the receiver system 17. On FIG. 13 the main components are identified with the input from the transmission lines 18, 19 to the input terminals 170 and 171 of the digital line receiver 172. This receives the pulses and passes them to the signal reconstruction unit 174 whereat they appear as positive pulses at signal terminals 212 and 213. They are then passed through inverting gates to the collector 176 which is a NAND gate collecting the pulses of both lines so that they appear at output 215 as a continuous pulse train 214 such as shown in FIG. 11. The pulses on the two transmission lines 18 and 19 may have actually three different states to be effectively a ternary condition; that is, line 18 may be positive of line 19 or it may be negative of line 19 or it may be at the same potential. This ternary condition is shown in the wave train 216 shown in FIG. 10. Merely as an illustration this wave train at FIG. 10 agrees with the switch conditions shown in FIG. 2 and illustrated as the two wave trains in FIG. 5, as transmitted by the transmitter system 16. The differential line receiver takes this ternary signal condition and changes it into a binary code of two wave trains, the same as that shown for lines 18 and line 19 of FIG. 5. Again in FIG. 10 it is assumed that there are only eight bits or pulses to that particular message train.

The collector 176 collects the pulses on both of these lines and makes them all of a single polarity shown as a positive polarity in the reconstructed wave train 214 of FIG. 11. This is for control purposes as described below. The actual two separate and complementary series of pulses as shown in FIG. 5 appear at the signal terminals 212 and 213. These are passed through the ring enable-disable unit 199 onto lines 218 and 219 and then to the active memory storage 196, as controlled by the decoder 190. The decoder 190 obtains its signals from the collector 176 via the one-shot multivibrator 178 and the natural binary counter 177. This natural binary counter 177 has an output as a natural binary code of numerals 1, 2, 4 and 8 on the lines 181, 182, 184 and 188, respectively. In this receiver system 17 it has been chosen to use an octal code as the decoded output of the decoder 190; hence, only the numerals 1, 2 and 4 of lines 181, 182 and 184 need be supplied to the decoder 190.

The natural binary counter is available as a commercial unit, for example, Motorola M839. The decoder 190 is also available commercially, for example, Motorola unit MC4038P. The decoder 190 changes this natural binary code into an octal code so that it distributes a signal sequentially along the eight output lines 221, from left to right. The active memory storage 196 includes a series of eight memory storage devices 222 each having master-slave sections. In the preferred embodiment these are clocked flip-flop units which are commercially available, for example, Motorola Units MC853. It will be noted that the eight output lines 221 from left to right lead to one each of these clocked flip-flop units in sequence from left to right. Accordingly, the decoder output enables each one of these clocked flip-flops in sequence from left to right at the same time that signals are arriving on lines 218 and 219. This means that in the master section of each clocked flip-flop, the particular pulse, whether negative or positive, is being stored in the memory or the master section of each of these flip-flops. It is only at the completion of the message train that the clocked flip-flops 222 are toggled and thus the information is dumped or transferred to the output lines which lead to the pairs of output terminal 21. As an illustration, a series of indicator lamps 224 are connected across these pairs of output terminals. As an example, and referring to FIG. 5, line 19 had pulses 2 and 5 out of the message train of only eight bits and accordingly, the second and fifth indicator lamps would be illuminated as an indication of the fact that the second and fifth switches were closed across the pairs of input terminals 20 in FIG. 2. These second and fifth lamps will remain illuminated, throughout successive scans and distributions, so long as the input switches S8-S15 remain in the position shown. The toggling of the flip-flops 222 does not change the output so long as the input information remains the same as before.

A gate 223 is connected to the reset input of each of the clocked flip-flops 222 to make certain that each is reset at the first turn-on of the power supplies, so that no false readings will be obtained.

The ring enable-disable unit 199 has permitted the decoder 190 to distribute the pulses or bits to the first eight output terminals 21 in the receiver main module 32. After these first eight bits, the first ring enable-disable gate 199 is gated; therefore disabling the decoder 190. Referring to FIG. 9 it may be considered that this first ring enable-disable gate 199 has been triggered or toggled to change its state so that the logic one or high condition on the left side is now a logic zero and the logic zero on the right side is now a one. With a one output from ring gate 199 facing a one output from the ring enable-disable gate 201, this enables the decoder extender 191 shown in FIG. 14. To accomplish this function the ring enable-disable gate 199 of FIG. 13 receives a signal from the natural binary counter 177. It will be appreciated that the eight numerals in an octal or base eight code are zero through seven. For a count of zero all three lines 1, 2 and 4 are low and at the last count of seven all three lines 1, 2 and 4 are high. This natural binary counter 177 is actually capable of counting up to 16 on the four output lines and on the count of eight, which is in the second group of eight bits, the lines 1, 2 and 4 will be low, however, line 8 will be high. This is on line 188 which is inverted by gate 225 to appear as a low on line 226. This is applied to the toggling input 227 of the clocked flip-flop 228 which is a part of the ring enable-disable gate 199. The low on the toggling input 227 drives the flip-flop output 229 low, and this connected back to line 226 maintains toggling input 227 low for the reset of the message train; that is, until reset on the reset line 205 which resets everything in the receiver system 17. During the first eight counts, line 188 has been low, and line 226 has been high. This has enabled gates 206 and 207 in the ring enable-disable gate 199 to permit these incoming bits to be applied via lines 218 and 219 to the clocked flip-flops 222. The clocked flip-flop 228 has two outputs and whereas output 229 has gone low, output 230 has gone high. This leads to the plug P230 which may plug into the end of line terminator 40 and return after a single inversion on plug P231. This signifies an end of count or end of message, whenever a signal is received on this line P231, and is a low because of the single inversion in the end of line terminator 40. This low pulse is applied through an inverting gate 232 to the neuter detector 209 which detects the neuter period 56 which is an indication of the end of message.

Figure 14:
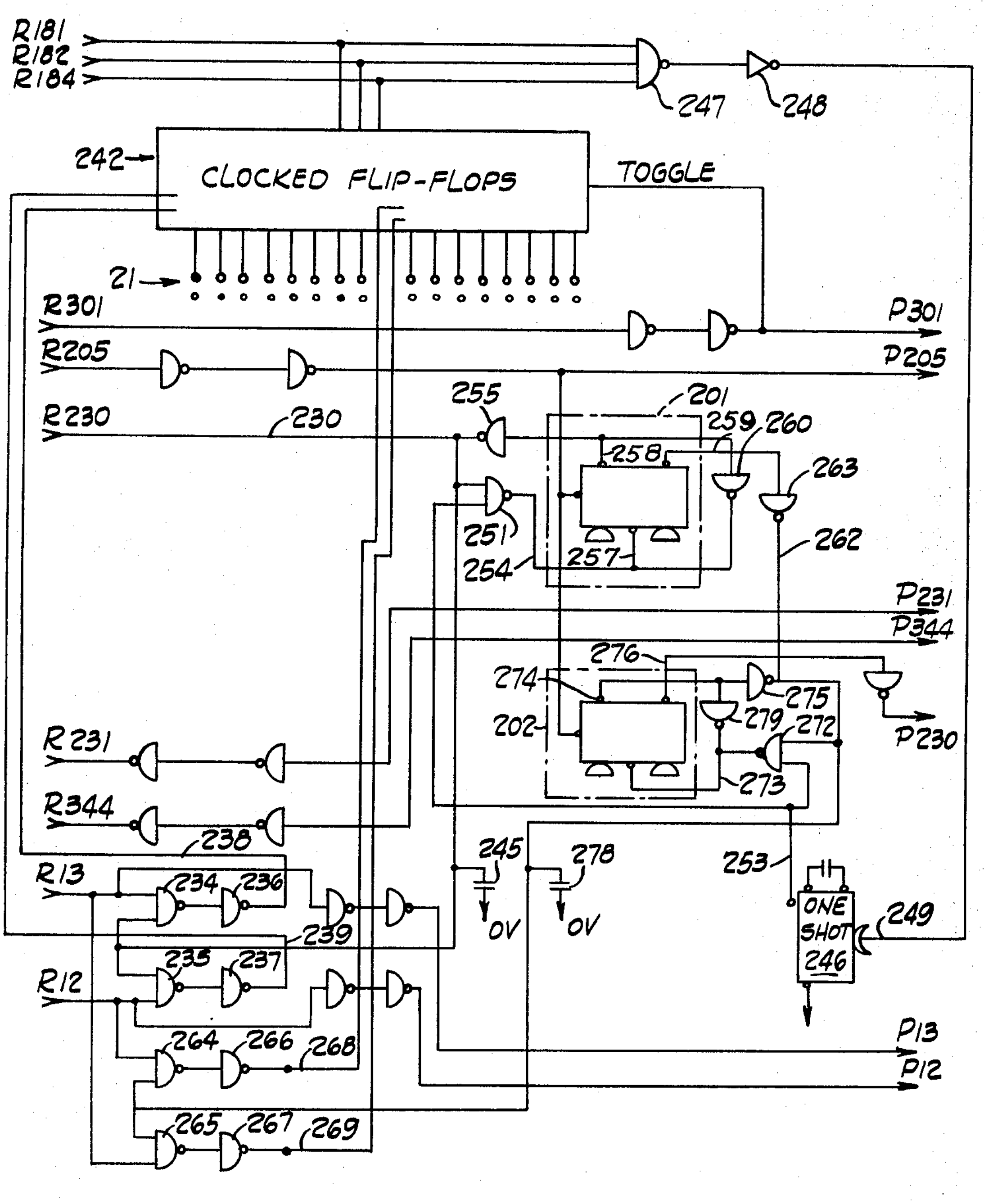
FIG. 14 is a schematic diagram of the circuit in one of the receiver extender modules.

When the end of line terminator 40 is not plugged in to these plugs P230 and P231, then a receiver extender module 33 may be plugged in and this contains circuitry as shown in FIG. 14. This high on plug P230 at the end of the first eight message bits enables the second ring enable-disable gate 201 shown in FIG. 14. It does this by sending a high through the receptacle R230 to this ring gate 201.

The incoming signals are on terminals 212 and 213 of the signal reconstruction unit 174. These are applied on terminals P12 and P13 of FIG. 13 and appear on receptacles R12 and R13 on FIG. 14. The pulse trains are like those of FIG. 5 and pass through the double inverting gates 234 to 237 which provide isolation and provide extra power to supply these signals to the active memory storage shown at the top of FIG. 14. After passing through the double inverting gates 234–237, the signals appear on lines 238–239 and applied to the active memory storage 242 which is a series of clocked flip-flops similar to the clocked flip-flops 222 in FIG. 13. Incoming numerals 1, 2 and 4 from the natural binary counter are received on receptacles R181, R182 and R184, respectively, to apply this base eight code to the clocked flip-flops 242. These flip-flops act in essentially the same manner as the flip-flops 222 and as described for FIG. 13 with decoding into a base 16 code, or more accurately decoding into a base 8 code twice in succession to sequentially enable 16 clocked flip-flops. After the entire message, the flip-flops are toggled to supply the information to the output terminals 21 shown in FIG. 14. This again is similar to the manner of distribution of these output signals as described above for FIG. 13.

The second group of eight bits are passed by the gates 234 and 235 in FIG. 13 to the lines 238 and 239 so long as these gates are enabled. They are enabled during this second group of eight bits by the ring enable-disable gate 201. During the first group of eight bits, when decoder 190 of FIG. 13 was active, then receptacle R230 was low. It goes high for the second group of eight bits and it will be noted that this line 230 goes to one of the two inputs on gates 234 and 235 and this high enables these gates so that the incoming signals on the remaining two inputs will be passed through to lines 238 to 239. Line 230 has a capacitor 245 connected to ground and the purpose is to permit line 230 to go high only as the capacitor charges. Thus there is a slight delay before line 230 goes high.

A one-shot multivibrator 246 has a toggling input 249 connected to a one of eight decoder 247 through an inverter 248. The one of eight decoder 247 thus has an output at the toggling input 249 which is normally low and only goes high on the eighth count. As each eighth count occurs, this input 249 goes high and then low so that the one-shot multivibrator 246 produces a very short positive going pulse from a terminal to an output line 253. This pulse is at the trailing edge of each eighth count. The short positive going pulse is applied to one of the two inputs on a gate 251. At the end of the first eight counts, line 230 input to gate 251 goes high, but in delayed real time because of the capacitor 245. Accordingly, the short positive-going pulse is not coincident with the change from low to high on line 230, and the output at line 254 on gate 251 remains high. At the end of the second group of eight signals, since the input on a gate 255 is already high, the short positive-going pulse on line 253 does drive the output 254 of gate 251 low and this toggles the toggling input 257 of the clocked flip-flop or ring enable-disable gate 201. Flip-flop 201 is toggled into its opposite bistable state. In toggling, the output of the ring gate 258 goes high and through an inverting gate 260 forces the toggling input 257 to go low and remain low in a locked condition until such time as the clocked flip-flop 201 is reset at its common reset terminal 261 which is connected to the common reset line 205. This is reset at the end of the message train.

At the end of the second group of eight signals, line 254 output of gate 251 went low and therefore caused the flip-flop 201 to toggle. Flip-flop output 258 went high and through the gate 255 had forced the line 230 low. This low condition disabled the gates 234 and 236, blocking the admission of any further signals. Just at the end of the second group of eight signals, since receptacle R230 is high, the positive-going pulse from the one-shot multivibrator 246 applied to an input of gate 251, causes the output 254 of gate 251 to go low, causing flip-flop 201 to toggle through the toggling input 257. When this action occurs, output 259 of flip-flop 201 goes low which through the inverting gate 263 causes its output line 262 to go low and this leads to and enables gates 264 and 265 for the third group of eight signals. This third group of eight signals are passed through the gates 264–267 to terminals 268 and 269 which are similar to terminals 238 and 239 except that they enable the third group of eight in the clocked flip-flops 242.

At the end of the third group of eight signals, line 262 is already high thus conditioning a gate 272 sr that the one of eight decoder 247 giving a short positive pulse from the one-shot 246 will then pass through this gate 272 producing a low on the output line 273 to toggle the next clocked flip-flop 202. Output 274 of this flip-flop 202 has been low for the first 24 signal bits but now goes high and acting through inverting gate 275 this forces line 262 low to disable the gates 264 and 265 thus terminating the signals in this third group of eight. Flip-flop output 274 has gone high and acts through gate 279 to lock toggling input 273 low. Also flip-flop output 276 has gone low and this through the inverting gate 277 makes plug P230 go high, which enables the next extender, should it be used. If the end terminator is used, then this causes reset of the entire receiver system 17 as explained above. Accordingly, it will be seen that each extender has two groups of eight signal bits which are enabled in turn and passed to the active memory storage 242. At the end of the entire message train, the master sections are triggered to dump or transfer the information stored therein to the slave sections and this is an output to the output terminals 21. Accordingly, the switch conditions as shown on switches 112 of FIG. 7 would be displayed on the indicator lamps connected to the output terminals 21 of FIG. 14. Capacitor 278 is connected from line 262 to ground for the same purpose as capacitor 245; namely, to prevent too rapid a rise of logic condition on this line 262.

FIG. 13 shows the neuter detector 209 in the main receiver module 32 of the receiver system 17. This neuter detector includes an integrator 290 which includes a reactive means shown as a capacitor 291 and a resistor 292 connected in series at a first junction 293 and connected across a DC supply source illustrated by a positive DC line 294 and a ground or zero-volt line 295. These may be the same lines as shown at the top of FIG. 13 which supply power to all of the components in the receiver system 17. Such lines at the left side of FIG. 13 have receptacles for connection to the receiver power supply module 34 shown in FIG. 1 and have plug connections at the right end for a connection to the next receiver extender module 33. This connection of the resistor and capacitor across the DC supply source is a means for charging this capacitor 291.

Amplifier means is included in the neuter detector 209 including a first transistor 298 and a second transistor 299 connected in cascade through a diode 300. The base of the second transistor 299 is an input which is connected to the junction 293 and the collector of the first transistor 298 is the output of the amplifier means, and is inverted twice for amplification and isolation to appear on a line 301 and a plug P301. As stated above the collector 176 collects the pulses from both lines and hence all the pulses in a reconsituted pulse train appear at the collector output terminal 215. This reconstituted pulse train is applied through an inverter 304 to a second junction 305. A unidirectional conducting device shown as a diode 306 conducts current from the first junction 293 to the second junction 305.

The neuter detector 209 detects the period at the end of the message train during which no bits or pulses are transmitted. This is an absence of pulse change, whether a high or a low. In the example given, this period is equal to the real time length of eight bits. At the beginning of this end of message, the junction 305 will go high because the collector output terminal 215 goes low during this neuter period. Junction 305 goes high provided also that the output from gate 232 goes high and remains high for the same period. Gate 232 is fed from the line 231 which comes from the end terminator 40 and line 231 is low at this end of message. During the period of transmission of the pulses in the message, the output at the junction 305 was pulsing between high and low at regular intervals corresponding to signal transmission rate and this action through diode 306 retained a near zero voltage on the capacitor 291. A slight build up of charges on this capacitor 291 exists between each signal in the form of a saw-tooth ramp. In other words, the capacitor charges during the intervals between pulses through the resistor 292 and then discharges through diode 306 during the pulses. During the neuter period there is a long time between pulses, and hence the capacitor 291 may be charged. During the normal transmission of signals this build-up of voltage on capacitor 291 is insufficient to cause the base of transistor 299 to conduct, since the voltage level required for conduction at the base of transistor 299 is equal to approximately 2.1 volts. This is equal to three times 0.7 volts as developed across transistors 298, 299 and diode 300. During the period of regular signal reception, therefore, the collector of transistor 298 will remain high since this transistor is not conducting and hence line 301 will also remain high through the gates 302.

The charging means through resistor 292 is a means to change an electrical condition of capacitor 291 in a first direction, and the discharging means through diode 306 is a means to change an electrical condition of capacitor 291 in the opposite direction. One of these means becomes dominant during the neuter period, in this embodiment it is the charging means.

At the end of the message stream, that is, the beginning of the end of message period, a period of silence equal to eight message bits provides sufficient time interval for capacitor 291 to charge to the point of conduction on the base of transistor 299 such that transistor 298 conducts at an uncritical time period lying approximately in the center of the neuter period which is the end of message. Such conduction causes terminal P301 to go low and this is the creation of a valid read pulse which is used to indicate reception of accurate and valid information. This valid read pulse is applied by line 301 to the active memory storage 196 and specifically to the toggling inputs of all the clocked flip-flops therein. This transfers all the information stored in the master sections to the slave sections which then appears across the output terminals 21 and across the indicator lamps 224, if provided. This low on the line 301 is reset and becomes a high on the leading edge of the next signal in the next message stream, so that the width of the read pulse is approximately the width of fourth or five real signals.

The interval timer checking circuit 208 is used to make certain that the actual signal bits or pulses are of the proper length of time and to make sure that noise pulses are rejected. If a noise pulse appears at the time that a signal pulse appears and if it lengthens the time duration of this pulse, then the interval time checking circuit 208 detects this and rejects the pulse. Also if the noise pulse appears in between signal pulses, this checking circuit 208 rejects such noise pulse. Accordingly, a level of security in transmission and reception of the message train is achieved without the need for mathematical coding employing redundant data. Nevertheless, additional circuitry to use this mathematical coding may be added if desired.

The interval timer checking circuit 208 includes an oscillator 310 which may be an oven temperature controlled crystal oscillator for accuracy. The oscillator may operate at a high frequency for example. 0.7 to 2.0 MHz. This oscillator frequency is divided by a series of dividers 311 and in this preferred embodiment the number of such dividers is one less than the number of dividers in the transmitter system 16. If each of the dividers is a divide by 16 divider, then the divider output at terminal 312 to a natural binary counter 313 will be 16 times the scanning frequency employed in the transmitter system 16. The scanning frequency might be in the order of 500Hz and therefore, the divider output 312 would be 8,000 Hz. The natural binary counter 313 counts in a scale of 16 on a four-line output to a NAND gate 314 and with an inverter 315 in the first line. This NAND gate 314 decodes a particular numeral, numeral 14 in this particular embodiment. The output of NAND gate 314 appears on a line 316 and will be a series of pulses which will be spaced in the same time interval as the received binary signals on the output 318 of the one-shot multivibrator 178. Precision is of the order of 0.01 percent because of the crystal controlled oscillators in both the transmitter and receiver systems. This interval timer 208 is reset by each remote binary bit on output 318 so as to easily permit precise measurement of the interval of time which should elapse before the reception of the next binary bit or digital signal.

The reset of the interval timer checking circuit 208 is provided from line 318 through a one-shot multivibrator 320. The incoming signals of the message train appear at terminals 212 and 213 in the signal reconstruction unit 174. The pulses on both lines are collected in the collector 176 and after passing through the one-shot 178 they appear at the output 318 thereof as reconstituted pulses. Due to the action of this one-shot 178, these pulses will not be of the original width but will be of a fixed width as determined by the time constant of the one-shot. These pulses of a fixed width are applied on line 318 to the second one-shot multivibrator 320. This second one-shot multivibrator 320 produces an output triggered from the normally low output on line 318, goes high and returns to low after the previously mentioned fixed time constant period. The one-shot 320, therefore, triggers when this pulse goes negative and produces a very narrow negative pulse at its output and this is passed through the inverting gates 321 also as a very narrow negative pulse whose position in real time, therefore, coincides with the trailing edge of the input pulse. This output is normally high, and the negative pulse is isolated and amplified through the gates 321 and appears on a line 322 which is a reset line to reset the natural binary counter 313 and all of the dividers 311. This action insures that the natural binary counter 313 will be reset in real time on the trailing edge of each incoming signal and is, therefore, capable of counting a precise time interval within the tolerance of the crystal oscillator to establish an output at line 316 which will be so spaced as to occur at the same time as the next negative-going end of pulse of the incoming binary signal. Having once occurred, the trailing edge of this next signal will again reset the dividers and binary counter 313 so as to restart the check.

Each received binary digit is checked for interval by this circuitry 208 by comparison with the position of the electrically generated internal bit and accepted only if the interval is within a preset percentage of what is should be. Since checking is in real time on an as-received basis, the width of the bit also affects acceptance. This means that noise which might extend the time duration of the bit will not be passed through the circuit.

Figure 11:
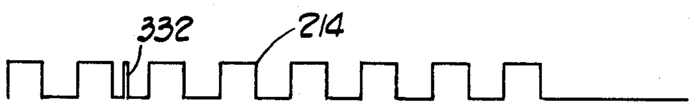
Figure 12:

The following circuitry produces an invalid or reject pulse if the check fails, and this is employed to reject the information so as to prevent registration of false information at the output terminals 21. The output from the interval time checking circuit 208 at line 316 is applied through an inverting gate 325 to a last count decoder circuit 210. The output on line 316 is normally high and due to the inverter 325, the output on line 326 is normally low, but permits it to go high for a period of time which will be approximately one-sixteenth of the width of the signal in the message train, due to the 16 times speed of the binary counter 313 relative to the speed of the counter 177. Accordingly, the line 326 goes high only for a short period of time and then returns to its low state. The last count decoder 210 includes a NAND gate 328 with three inputs, one from line 326, one from line 231 and one from a line 329 which comes from the inverted output of the one-shot multivibrator 178. The NAND gate 328 is used to produce an invalid or reject pulse at its output 205 and at plug P205 as a result of the combination of three signals which appear on the inputs. During the normal course of reception, line 231 will be high, line 329 will be high during the interval when the signal is not being received but will go low during the interval when the signal is being received. When valid signals are being received, line 326 will go high only during a period when line 329 is low so that the gate output 330 will never go low during valid reception. In this action, signals being received at input 329 of gate 328 will succeed in holding the output 205 high since they share this function of signals being received with line 231. In the event that distortion or jitter occurs on incoming signals, for example, the introduction of an extraneous signal due to noise, the first action will be to reset the counter 313 through line 322 as a result of reception of this extraneous signal. This counter 313 will then proceed to count off its measured time interval and will produce a check signal with incorrect spacing, that is, at a time when no second real signal is present. This is illustrated in FIGS. 11 and 12 wherein an extraneous noise pulse 332 is shown in the reconstituted pulse train 214. One cycle later, a similar duration checking pulse 333 is produced in the checking pulse train 334. These pulses in the check pulse train 334 are delayed by one pulse, due to the action of the interval timer check circuit 208. It will be recalled that for each pulse received in the reconsituted pulse train, this resets the natural binary counter 313 and dividers 311, so that there appears on the output line 316 a check pulse which is delayed in real time by the amount of time between binary bits or pulses. This is the reason for the checking pulse train 334 in FIG. 12 being delayed one pulse behind the reconstituted pulse train 214 of FIG. 11.

This noise pulse 332 in FIG. 11 thus produces a noise check pulse 33 in FIG. 12 with incorrect spacing; that is, at a time when no real signal is present. This would permit line 326 to go high at the same time that lines 231 and 329 are high which will permit the output 205 to go low for a reject pulse. This reject pulse is applied to the reset input of the natural binary counter 177 to reset it and is also applied on plug P205. This is the reject line proceeding forwardly to all of the receiver extenders to reset all of those units thus rejecting that part of the message train received up to that time.

When the output 205 of gate 328 goes low, it couples through a diode 338 to discharge a small capacitor 339. When this capacitor is discharged, it couples through a diode 340 to prevent capacitor 291 from recharging and going high through the resistor 292 until a longer than normal period of time has elapsed.

The reject condition which drives the output 205 of gate 328 low as a result of reception of invalid messages, has a width of approximately one-twelfth to one-sixteenth that of the shaped signal as it appears at output 318 of the one-shot multivibrator 178. This width insures complete discharge of capacitor 339 through the diode 338. A very short reset occurs at the beginning of each message train at the output of a NAND gate 343 because an input 344 thereof comes from the end terminator 40 and goes high at the end of each message and remains high until the arrival of the first signal in the next message. At this time the other input to gate 343 from line 215 is also high; hence, this drives the output of gate 343 low for a reset of the entire system, but this is only for a very short time as is required to complete a normal reset. This time period is insufficient to affect the charge on capacitor 339 in normal operation.

FIG. 12 shows that there is a last check signal 335 appearing on line 326 which is one pulse later than the end of message. This does not create a reject pulse, however. Normally one would think that this makes all three inputs 326, 231 and 329 on the NAND gate 328 high, but the signal on line 231 from the end terminator 40 has at this time gone low and thus this masks this last check pulse 335 so that no reject pulse is created.

The above description shows that the NAND gate 328 acts as a reject gate and as a comparator to establish the reject pulse in the event that the negative-going pulse on input 329 is not coincident with and does not overlap the positive-going pulse on input 326. If this does not occur, this indicates the presence of a noise pulse rather than the presence of a valid pulse on the pulsed message train. The interval timer checking circuit 208 is a checking pulse frequency means generating an internal frequency to check the time interval between valid bits in the pulsed message stream. If a noise pulse such as pulse 332 in FIG. 11 is received, this is out of the proper time period for receiving a valid message bit and the interval detector 208 detects this; hence, rejects this noise pulse and all other pulses in that particular message train received up to that point in time.

The NAND gate 314 decodes one of *n* pulses from the checking frequency means. In the preferred embodiment numeral *n* is 16. The multivibrator 178 is a pulse narrowing means according to the R-C time constant thereof such that the pulse is approximately n times narrower than the pulses at terminal 215. The negative-going pulses on output 329 coincide in time with either the leading or trailing edge of the pulses at collector terminal 215 and in this preferred embodiment the leading edges coincide in time.

The last count decode gate 210 is not only a comparator and reject gate but also a gate to decode the last count, because upon end of count from the end terminator 40, this puts a low on an input 231 to this gate 328, maintaining the output 205 thereof high and hence no reject pulse is generated. A low condition of the output is the reject pulse which resets everything in the receiver system 17 including counter 177, flip-flop 228 and the ring enable-disable gates 201 and 202 in FIG. 14.

FIG. 6 shows the circuit for the transmitter main module 26 and this circuit includes a transmitter line protection circuit 151. This circuit includes diodes 152–155 connected to the transmission lines 18 and 19 to protect the line from accidental overload due to overvoltage or transient induced or coupled spikes onto the communication line 18, 19. These diodes 152–155 clamp the transmission line between zero voltage and positive applied voltage, shown here as +5 volts. High speed diodes are not required due to capacitive effects of the communication transmission line 18, 19 preventing build-up of very steep transients. The terminals 93 and 94 are the terminals which are connected to the external communication circuit which is usually a telephone line or a pair of wires passing through what can be a noisy environment. Normally the NAND gates 96 and 100 create voltage excursions which lie between zero volts and +5 volts. If any external source attempts to create voltage excursions which exceed this, the diodes 152 and 153 clamp this if the voltage is higher than +5 volts and diodes 154 and 155 clamp if the voltage is below zero volts. This protective circuit 151 works well on a communications circuit even though the diodes are not high speed diodes because of the reactive effects of the communication circuit.

FIG. 13 also shows a ternary to binary circuit 350 which is used in the receiver system at the incoming terminals 170 and 171 from the transmission line 18 and 19. In this circuit the incoming transmission line can have three states. Both sides of the line can exist at zero or neutral volts or one line can be positive with respect to the other or that line can be negative with respect to the other. The ternary to binary circuit 350 includes a digital line receiver which includes generally first and second operational amplifiers 351 and 352.

Figure 10:
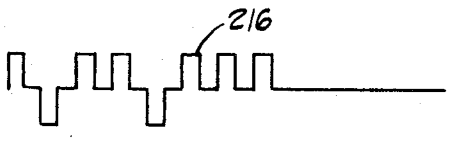
FIGS. 10, 11 and 12 are waveform diagrams.

The effect is that shown in FIG. 10; namely, if one put a voltmeter or an oscilloscope across the input terminals 170, 171, one would observe a ternary input condition similar to the waveform 216 shown in FIG. 10. The two op-amps 351 and 352 are coupled through inverters 365 and 366 to the signal reconstruction unit 174. The two lines into this unit 174 have a binary output reconstructed as shown in FIG. 5; that is, some pulses are on one line and a complementary set of pulses are on the other line. The two op-amps 351 and 352 are connected back-to-back through a network of resistors 353–363. In the case of op-amp 352, these are polarized through resistor 354, the upper end of which is at volts from the line 294 and the lower end of which forms a voltage divider at the inverting input terminal of op-amp 352 and passes through resistors 359, 363, 360 and 356 to a minus voltage terminal, −5 volts in this embodiment. The values of the resistors in this voltage divider are so chosen to establish a polarizing potential across the input terminals of op-amp 352 slightly greater than 50 millivolts plus on the inverting input terminal. This maintains the output through twice inverted op-amp 352 and gate 366 so that the output on line 368 is a binary high condition; that is, +5 volts. Similarly, a voltage divider network consisting of resistors 353, 358 and 363, 357 and 355 to −5 volts establishes polarization on the input of op-amp 351 such that the output of gate 365 at line 369 is also a binary high condition. This polarizing condition exists when zero volts is present across the input terminals 170 and 171. Also this condition exists if any polarizing voltage on terminals 170, 171 is less than 50 millivolts, the attenuation being achieved through the network of resistors 361, 363 and 362. If a signal voltage of, for example 700 millivolts is placed across the input terminals 170 and 171, with input line 171 being positive with respect to 170, then through resistors 362 and 359 to the inverting input of op-amp 352, this signal voltage will act to increase the existing polarization on this op-amp, and therefore, will cause no change at the output terminal 368. However, the same positive signal voltage through resistors 362 and 357 will act to attempt to drive the non-inverting input more positive than the inverting input when in fact its polarizing voltage maintains it more negative than the inverting input, and if successful will cause the binary logic one at the output 369 to invert to a binary zero. Similarly, if the signal voltage at the incoming transmission line terminals 170 and 171 is reversed, the outputs at 368 and 369 will reverse in binary significance. In this manner the three-state ternary operation effective on the incoming line is changed into a binary condition on the lines 368 and 369. When no voltage exists across input terminals 170, 171, then binary logic ones are obtained from the output 368–369. It will be noted that this is an inverted signal and the first pair of inverters in the signal reconstruction units 174 reinvert this to obtain positive-going pulses, similar to those shown in FIG. 5 at the signal terminals 212 and 213.

One of the characteristics of the digital line receiver of op-amps 351 and 352 is that it has common mode rejection; that is, no change in digital output occurs if the input terminals on op-amps 351 and 352 are changed in voltage between the limits of the power supply voltage without changing their differential relationship to each other. Since the output pulses of the digital transmitter system are a full five volts, if the receiver was to be employed on a line which had no loss, then the voltage at this receiving point would be +5 volts. This could impair the operation of the receiver since it would be approaching the point at which common mode rejection is lost. In order to limit this the receiver protection circuit 370 is employed. This receiver protection 370 employs voltage limiting devices shown as diodes and more specifically breakdown diodes. In this preferred embodiment they are shown as Zener diodes 371–374. The two Zener diodes 371 and 372 are placed in series and of inverse polarity having a bipolar breakdown point of approximately three volts. Similarly, Zener diodes 373 and 374 are placed on the opposite side of the line to the zero volt line 295 so as to forcibly limit the maximum level of the input signal to a 3 volt excursion. Additionally, these Zeners provide line protection against surges and spikes at the receiver terminals 170 and 171 in the same manner that the protection circuitry 151 did in the transmitter system 16.

The circuit in FIG. 6 shows a line protection circuit for the transmitter end of the transmission line 18–19 and the circuit of FIG. 13 shows a line protection circuit for the receiving end of this transmission line. In each case, first and second diode means are included with the DC reference source having at least a first reference terminal, namely, ground potential. In FIG. 6 it will be observed that if line 19 should have high enough positive voltage thereon, then a first diode means including diodes 152 and 155 will conduct through the DC reference source so long as the voltage on the transmission line exceeds the combined voltage drop of diodes 152 and 155 and the voltage of the DC voltage source. Conversely, if line 19 is sufficiently negative relative to line 18, then a second diode means including diodes 153 and 154 will conduct through the DC reference source.

The arrangement of the diodes in FIG. 6 is a diode bridge with the DC reference source connected across opposite terminals.

In the receiver system of FIG. 13 the protection circuit 370 also has first and second diode means. If the voltage on input terminal 170 is sufficiently positive of the voltage on terminal 171, then there will be conduction through the first diode means governed largely by the breakdown voltage of diodes 371 and 374, plus the forward drop across diodes 372 and 373. Conversely, if terminal 171 is sufficiently positive, there will be conduction through the breakdown diodes dependent primarily on the breakdown voltage of diodes 373 and 372 plus the forward voltage drop of diodes 374 and 371. For purposes of symmetry, these are all made substantially equal in breakdown voltage. This also establishes the center point of the four breakdown diodes as connected to zero reference potential at line 295. Because the incoming signal may travel a great distance, and because the ground for the transmitter system 16 may be far removed from or not even electrically connected to the ground of the receiver system 17, this interconnection of the diodes 372 and 374 to zero reference potential equalizes the line. By this is meant that a definite relationship is maintained between the voltage on the incoming transmission line terminals 170–171 and the voltage of the DC source 294–294. In the circuit of FIG. 13 the breakdown diodes are connected to at least one terminal of the DC voltage source. However, no voltage from such voltage source is connected in the voltage limiting circuit with the breakdown diodes. Accordingly, it is only the voltage of the breakdown diodes themselves which must be exceeded before limiting of the voltage across the transmission line occurs.

The digital line receiver 350 includes the resistive network of resistors 353–363. Included in this resistive network are first and second voltage dividers. The first voltage divider may be considered as including first through fourth resistors 353, 358, 360 and 356, respectively, connected between the positive and negative terminals of the DC source. The second voltage divider may be considered as including fifth, sixth, seventh and eighth resistors 354, 359, 357 and 355, respectively, also connected between the positive and negative source terminals. Symmetry is provided in the resistive network such that the potential established by these voltage dividers at the first or inverting amplifier input terminals is the same. These may be considered first points on the two voltage dividers. Also symmetry is provided such that the potential is the same at second points on the voltage dividers across which the resistor 363 is connected. This means that there will be no material current flow through this resistor 363 as a result of these polarizing voltages applied to the amplifiers 351 and 352. It will be noted that the second input terminal of the first amplifier is connected to a second voltage divider at a third point and the second input of the second amplifier is connected to the first voltage divider at a third point. Due to symmetry, these third points are also at the same potential. The amplifier inputs being connected to the aforesaid first and third points establishes a small polarizing voltage which is a small fraction of the DC source voltage. By way of example, this may be 50 millivolts. This maintains both amplifiers non-conducting in the absence of a signal on the transmission line. Also the amount of the incoming signal, positive on a particular line, must be of a magnitude and of a proper polarity to exceed and hence nullify this pre-established polarizing voltage before the respective amplifier will change its state of conduction. In the example given, the amplifiers are normally non-conducting in the absence of a signal and hence will turn on for a high logic output when the polarizing voltage is nullified. When a signal appears across the transmission line, current flows through resistor 363 to upset the equalized or balanced condition and thus turn on the respective amplifier.

The present disclosure includes that contained in the appended claims, as well as that of the foregoing description. Although this invention has been described in its preferred form with a certain degree of particularity, it is understood that the present dislcosure of the preferred form has been made only by way of example and that numerous changes in the details of the circuit and the combination and arrangement of circuit elements may be resorted to without departing from the spirit and scope of the invention as hereinafter claimed.

What is claimed is:

1. A multiplexer comprising, in combination, a transmitter system and a receiver system;

said transmitter system having a plurality of input terminals thereon, output means on said transmitter system, multiplexing circuits within said transmitter system to transmit to said output means the electrical condition at said input terminals thereon, said receiver system including input means for receiving multiplexed information from said output means of said transmitter system, said receiver system having output means, multiplexing decoder circuits within said receiver system to receive and decode the signals and supply same to said receiver system output means to indicate the electrical condition of the input terminals on said transmitter system, one of said systems including a main module and at least one extender module, and connection means including complementary plug and receptacle means to electrically and physically connect in sequence one module directly with the next adjacent module.

2. A multiplexer as set forth in claim 1, wherein each of said systems includes a main module and at least one extender module, and connection means including complementary plug and receptacle means to electrically and physically connect said modules in said sequence.

3. A multiplexer as set forth in claim 1, wherein said plug and receptacle means are multiple conductor devices.

4. A multiplexer as set forth in claim 1, wherein said transmitter system and said receiver system each has a plurality of modules with exposed faces accessible from the front thereof, said transmitter system input terminals including a plurality of pairs of input terminals on the exposed face of said transmitter modules, and said receiver system output means including a plurality of pairs of output terminals on the exposed face of said receiver modules.

5. A multiplexer as set forth in claim 1, including a power supply module for each said transmitter system and said receiver system and interconnected in the respective transmitter and receiver system by said plug and receptacle means.

6. A multiplexer as set forth in claim 1, including at least one module in each system and having an exposed face, a pair of transmission line terminals on said exposed face of said module in said transmitter system as said output means thereof, and a pair of transmission line terminals on said exposed face of said module in said receiver system as said input means thereof.

7. A multiplexer as set forth in claim 1, including an end terminator having internal electronic components and a complementary plug or receptacle means selectively connectable on the end one of the sequence of modules to electrically terminate the modules in transmitting or receiving multiplexed information.

8. A multiplexer as set forth in claim 1, including means to scan said input terminals as part of said transmitter multiplexing circuits, an end terminator having internal electronic components and a complementary plug or receptacle means selectively connectable on the end one of the sequence of said transmitter modules to electrically terminate the scan of said input terminals.

9. A multiplexer as set forth in claim 1, wherein said multiplexing decoder circuits include means to sequentially supply the multiplexed signal to said receiver output means, and an end terminator having complementary plug or receptacle means selectably connectable on the end one of the sequence of receiver modules to electrically terminate the received multiplexed signals.

10. A multiplexer as set forth in claim 1, wherein said physical connection means includes channel means receiving said modules, and guide means in said channel means aligned parallel to the electrical connection means in said plug and receptacle means.

11. A multiplexer as set forth in claim 10, wherein said channel guide means includes complementary tongue and groove means on said channel means and on said modules.

12. A multiplexer as set forth in claim 10, including said channel having two legs and a U-shape in cross-section, and at least one of said legs being resilient to aid in insertion and removal of said modules.

13. A multiplexer as set forth in claim 1, wherein said physical connection means includes a channel receiving said modules in an integrated sequence therein.

14. A multiplexer as set forth in claim 13, wherein said channel aligns said modules to permit interconnection of said complementary plug and receptacle means.

15. A multiplexer as set forth in claim 13, including said channel having legs in a U-shape, inturned feet on said legs of said channel and a groove on said modules receivable in said inturned feet to laterally retain said modules in said channel.

16. A multiplexer, comprising in combination, a transmitter system and a receiver system, transmission means between said transmitter and receiver systems to transmit multiplexed signals, said transmitter system including, encoder means having a main encoder with a first plurality of pairs of input terminals with an open or closed condition, at least one encoder extender in said encoder means having a second plurality of pairs of input terminals, means to sequentially scan said pairs of input terminals in said main encoder, gate means connected to said encoder means and gated upon completion of scan of said input terminals of said main encoder to initiate the scan of said input terminals in the next adjacent encoder extender, and means connecting said encoder means to supply to said transmission means the sequentially scanned information of the open or closed condition of said input terminals.

17. A multiplexer as set forth in claim 16, including an end terminator connected to the terminal one of said encoder extenders to terminate the scan of the pairs of input terminals in said encoder extender.

18. A multiplexer as set forth in claim 16, including an end terminator connected to the terminal one of said encoder extenders to terminate the scan and reinitiate the sequential scan of the pairs of input terminals in said main encoder.

19. A multiplexer as set forth in claim 16, including line-driver means connecting said encoder means to supply scanned information to said transmission means.

20. A multiplexer as set forth in claim 16, wherein said sequential scan means includes means developing a scanning frequency, and means to connect said scanning frequency means to said encoder means to sequentially scan said pairs of input terminals in said main encoder.

21. A multiplexer as set forth in claim 20, wherein said scanning frequency developing means includes an oscillator of a high frequency, and divider means dividing said oscillator frequency to a slower scanning frequency.

22. A multiplexer as set forth in claim 20, wherein said scanning frequency developing means includes an oscillator of a high frequency, divider means dividing said oscillator frequency to a slower scanning frequency, and a natural binary counter connected to said divider means.

23. A multiplexer as set forth in claim 16, including at least two encoder extenders,
first and second gate means,
said gate means having an AND gate function gating the respective encoder extender,
said first gate being gated upon completion of scan of the input terminals of said main encoder to initiate the scan of said input terminals in the adjacent encoder extender,
and said second gate being gated upon completion of scan of said input terminals of said adjacent encoder extender to initiate the scan of said input terminals in the next adjacent encoder extender.

24. A multiplexer, comprising in combination,
a transmitter system and a receiver system,
transmission means between said transmitter and receiver systems to transmit multiplexed signals,
said receiver system including,
decoder means having a main decoder with a first plurality of pairs of output terminals,
means connecting said transmission means to said decoder means to decode and distribute said multiplexed signal to said pairs of output terminals in said main decoder,
at least one decoder extender in said decoder means having a second plurality of pairs of output terminals,
and gate means connected to said decoder means and gated upon completion of distribution to said output terminals of said main decoder to initiate the distribution to said output terminals in said next adjacent decoder extender.

25. A multiplexer as set forth in claim 24, including an end terminator connected to the terminal one of said decoder extenders to terminate the distribution to the pairs of output terminals in said decoder extender.

26. A multiplexer as set forth in claim 24, including an end terminator connected to the terminal one of said decoder extenders to terminate and reinitiate the sequential distribution to the pairs of output terminals in said main decoder.

27. A multiplexer as set forth in claim 24, including first and second gates in said gate means,
at least two decoder extenders in said decoder means,
said first gate being gated upon completion of distribution to the output terminals of said main decoder to initiate the distribution to said output terminals in the adjacent decoder extender,
and said second gate being gated upon completion of distribution to said output terminals of said adjacent decoder extender to initiate the distribution to said output terminals in the next adjacent decoder extender.

28. A multiplexer as set forth in claim 24, including a temporary memory storage in said decoder means,
said decoder means applying said decoded signals in sequence to said memory storage,
checking means to check the authenticity of the received signals and to emit a check signal,
and means connecting said check signal to activate said memory storage to transfer the stored information to the respective output terminals of said receiver system.

29. A multiplexer as set forth in claim 24, including a temporary memory storage in said decoder means,
said temporary memory storage having storage devices equal in number to the number of pulses in a message train received by said receiver system,
each memory storage device having master-slave sections,
said decoder means applying said decoded signals in sequence to the master section of the storage devices,
checking means to check the authenticity of the received signals and to emit a check signal,
and means connecting said check signal to activate said memory storage to transfer the stored information from the master section to the slave section and thus to the respective output terminals of said receiver system.

30. A multiplexer as set forth in claim 24, including external termination means on each of said slave units to provide a visual or aural indication of the condition of the respective multiplexed signal bit.

* * * * *